(12) United States Patent
Ogura

(10) Patent No.: US 12,219,122 B2
(45) Date of Patent: Feb. 4, 2025

(54) INFORMATION PROCESSING APPARATUS, IMAGE PROCESSING SYSTEM, AND INFORMATION PROCESSING METHOD

(71) Applicant: SONY GROUP CORPORATION, Tokyo (JP)

(72) Inventor: Sho Ogura, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/907,854

(22) PCT Filed: Feb. 15, 2021

(86) PCT No.: PCT/JP2021/005519
§ 371 (c)(1),
(2) Date: Aug. 29, 2022

(87) PCT Pub. No.: WO2021/199735
PCT Pub. Date: Oct. 7, 2021

(65) Prior Publication Data
US 2023/0128305 A1  Apr. 27, 2023

(30) Foreign Application Priority Data
Mar. 30, 2020  (JP) .................. 2020-061248

(51) Int. Cl.
H04N 13/351  (2018.01)
G06T 5/50  (2006.01)

(52) U.S. Cl.
CPC ............. H04N 13/351 (2018.05); G06T 5/50 (2013.01); G06T 2207/20221 (2013.01)

(58) Field of Classification Search
CPC ............ G06T 2207/20221; G06T 5/50; H04N 13/117; H04N 13/282; H04N 13/351; H04N 21/21805; H04N 21/2187; H04N 21/8549
See application file for complete search history.

(56) References Cited

U.S. PATENT DOCUMENTS

| 9,865,308 B2 * | 1/2018 | Gower ................. G11B 27/34 |
| 2017/0244991 A1 * | 8/2017 | Aggarwal ............. G06V 20/46 |

(Continued)

FOREIGN PATENT DOCUMENTS

| EP | 2413286 A1 | 2/2012 |
| JP | 2012034365 A | 2/2012 |

(Continued)

Primary Examiner — Ming Wu
(74) Attorney, Agent, or Firm — Paratus Law Group, PLLC

(57) ABSTRACT

There is provided an image processing system including a first information processing apparatus and a second information processing apparatus. The first information processing apparatus performs processing, for a plurality of captured images simultaneously captured by a plurality of image capturing devices, for identifying a generation target image section for which a free-viewpoint image is generated, performs control to transmit image data for the generation target image section in each of the plurality of captured images as image data used for generation of a free-viewpoint image in the second information processing apparatus, and generates an output image including a free-viewpoint image received. The second information processing apparatus performs processing for acquiring image data for the generation target image section in each of the plurality of captured images, performs processing for generating a free-viewpoint image by using the image data (Continued)

acquired, and performs control to transmit the free-viewpoint image generated to the first information processing apparatus.

19 Claims, 13 Drawing Sheets

(56) References Cited

U.S. PATENT DOCUMENTS

| | | | |
|---|---|---|---|
| 2019/0356906 A1 | 11/2019 | Handa | |
| 2020/0027242 A1* | 1/2020 | Koyama | ............. H04N 17/002 |
| 2020/0034989 A1* | 1/2020 | Koyama | ............. H04N 17/002 |

FOREIGN PATENT DOCUMENTS

| | | |
|---|---|---|
| JP | 2017211828 A | 11/2017 |
| JP | 2019-079298 A | 5/2019 |
| JP | 2020-036116 A | 3/2020 |
| WO | WO 2018/030206 A1 | 2/2018 |
| WO | WO-2018181249 A1 | 10/2018 |
| WO | WO 2020/012748 A1 | 1/2020 |

\* cited by examiner

FIG. 6
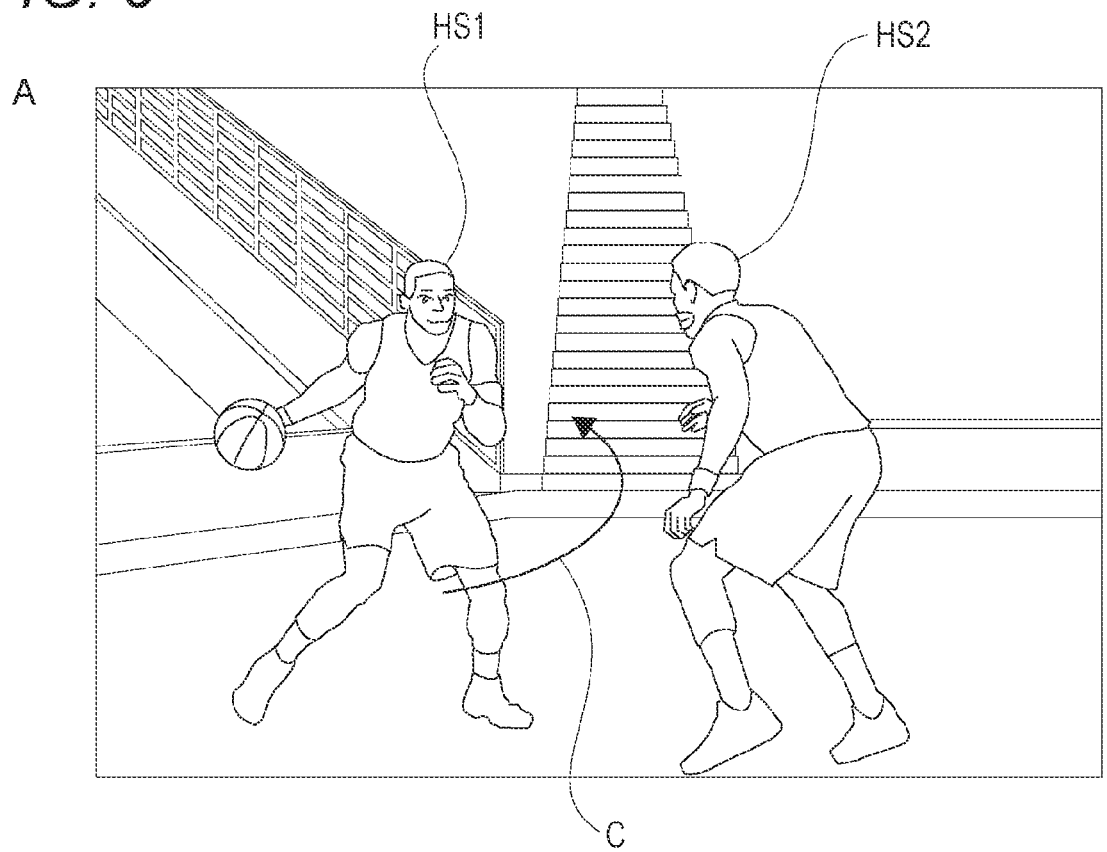
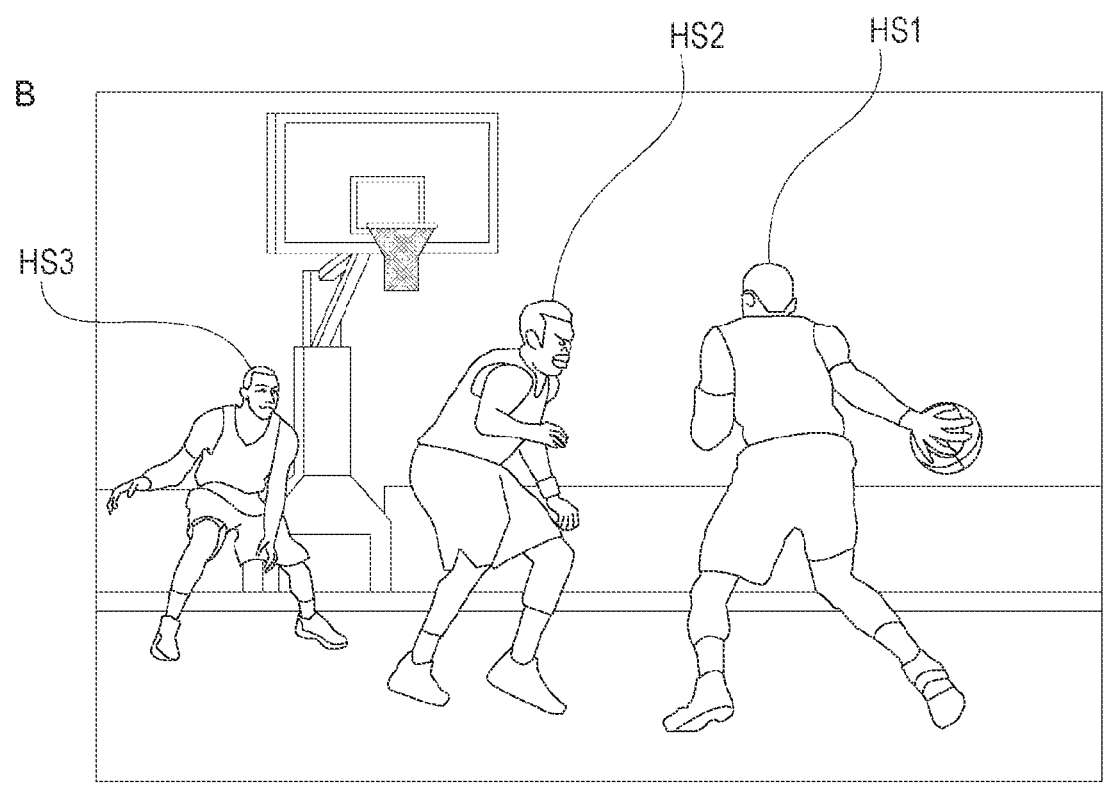

INFORMATION PROCESSING APPARATUS, IMAGE PROCESSING SYSTEM, AND INFORMATION PROCESSING METHOD

CROSS REFERENCE TO PRIOR APPLICATION

This application is a National Stage Patent Application of PCT International Patent Application No. PCT/JP2021/005519 (filed on Feb. 15, 2021) under 35 U.S.C. § 371, which claims priority to Japanese Patent Application No. 2020-061248 (filed on Mar. 30, 2020), which are all hereby incorporated by reference in their entirety.

TECHNICAL FIELD

The present technology relates to an information processing apparatus, an image processing system, and an information processing method, and particularly relates to a technology related to processing on a free-viewpoint image that allows a subject whose image has been captured to be observed from any viewpoint in a three-dimensional space.

BACKGROUND ART

A technology is known which generates a free-viewpoint image (also referred to as a free-viewpoint video, a virtual viewpoint image (video), or the like) corresponding to an image observed from any viewpoint in a three-dimensional space on the basis of three-dimensional information representing, in the three-dimensional space, a subject whose image has been captured.

Patent Document 1 below can be mentioned as a related conventional technology. Patent Document 1 discloses a technology related to generation of a camerawork that can be said to be a path of viewpoint movement.

CITATION LIST

Patent Document

Patent Document 1: WO2018/030206 A

SUMMARY OF THE INVENTION

Problems to be Solved by the Invention

A free-viewpoint image is useful also as broadcast content, and is also used as a replay image of a sports broadcast, for example. For example, in a soccer or basketball broadcast, a clip of a few seconds such as a shooting scene are created from images recorded in real time and the clip is broadcasted as a replay image. In the present disclosure, the "clip" is an image of a certain scene created by cutting out or further processing a recorded image.

Meanwhile, in a broadcast site, an operator of a live broadcast is required to, for example, create a clip for replay very quickly and broadcast the clip.

In light of the above, the present technology proposes a technology to enable faster execution of image production of a clip or the like including a free-viewpoint image.

Solutions to Problems

An information processing apparatus according to the present technology includes a section identification processing unit configured to perform processing, for a plurality of captured images simultaneously captured by a plurality of image capturing devices, for identifying a generation target image section for which a free-viewpoint image is generated, a target image transmission control unit configured to perform control to transmit image data for the generation target image section in each of the plurality of captured images as image data used for generation of a free-viewpoint image in another information processing apparatus, and an output image generation unit configured to generate an output image including a free-viewpoint image received.

The information processing apparatus is, for example, an information processing apparatus that functions as a main controller for creating an image such as a clip in an image processing system. The information processing apparatus identifies a generation target image section of one frame or a plurality of frames that generates a free-viewpoint image, and transmits image data of only the generation target image section in the plurality of captured images to another information processing apparatus (free-viewpoint image server that actually creates a free-viewpoint image). Then, the created free-viewpoint image is received to generate an output image.

In the information processing apparatus according to the present technology described above, it is conceivable that the section identification processing unit performs processing for notifying the another information processing apparatus of information regarding the generation target image section identified, and the target image transmission control unit performs transmission control on image data for the generation target image section in response to a request from the another information processing apparatus.

The generation target image section is notified to the another information processing apparatus, which enables the another information processing apparatus to designate image data necessary to generate the free-viewpoint image.

In the information processing apparatus according to the present technology described above, it is conceivable that the section identification processing unit identifies, as the generation target image section, a section of one frame of a captured image.

This is processing in the case of generating a free-viewpoint image in the generation target image section of one frame, that is, a free-viewpoint image in which the viewpoint is changed in the state of a still image with the time stopped.

In the information processing apparatus according to the present technology described above, it is conceivable that the section identification processing unit identifies, as the generation target image section, a section of a plurality of frames of a captured image.

This is processing in the case of generating a free-viewpoint image in the generation target image section of a plurality of frames, that is, a free-viewpoint image in which the viewpoint is changed in the state of a moving image without stopping the time.

In the information processing apparatus according to the present technology described above, it is conceivable that the output image generation unit generates an output image obtained by combining, on a time axis, a previous image or a subsequent image with a free-viewpoint image.

That is, in a case where the information processing apparatus receives a free-viewpoint image created by another information processing apparatus, the information processing apparatus connects the previous and subsequent images to the free-viewpoint image to obtain an output image.

In the information processing apparatus according to the present technology described above, it is conceivable that the output image generation unit generates an output image as a virtual clip obtained by virtually combining, on a time axis, a free-viewpoint image with a previous image or a subsequent image on the basis of playback list information.

That is, in a case where the information processing apparatus receives a free-viewpoint image created by another information processing apparatus, the previous and subsequent images are connected to form an output image, and the connection of the images is virtually performed as a connection on the playback list information indicating the order of playback.

In the information processing apparatus according to the present technology described above, it is conceivable that the output image generation unit acquires, from the another information processing apparatus, information designating a previous image or a subsequent image to be connected to a free-viewpoint image, and generates an output image obtained by combining, on a time axis, the previous image or the subsequent image with the free-viewpoint image on the basis of the information acquired.

That is, the information processing apparatus receives a free-viewpoint image created by another information processing apparatus, and also receives, from the another information processing apparatus, information designating the previous and subsequent images to be connected to the free-viewpoint image.

In the information processing apparatus according to the present technology described above, it is conceivable that the output image generation unit acquires, from the another information processing apparatus, information designating a time length of a previous image or a subsequent image to be connected to a free-viewpoint image, prepares the previous image or the subsequent image on the basis of the information acquired, and generates an output image obtained by combining, on a time axis, the previous image or the subsequent image with the free-viewpoint image.

That is, the information processing apparatus receives a free-viewpoint image created by another information processing apparatus, and also receives, from the another information processing apparatus, information regarding the time lengths of the previous and subsequent images to be connected to the free-viewpoint image.

Another information processing apparatus according to the present technology includes a target image acquisition unit configured to acquire image data for a generation target image section for which a free-viewpoint image is generated in each of a plurality of captured images simultaneously captured by a plurality of image capturing devices, an image generation processing unit configured to generate a free-viewpoint image by using the image data acquired by the target image acquisition unit, and a transmission control unit configured to perform control to transmit the free-viewpoint image generated to another information processing apparatus.

The information processing apparatus is, for example, an information processing apparatus that functions as a free-viewpoint image server in the image processing system. The information processing apparatus acquires a plurality of captured images as a section of a scene for which a free-viewpoint image is generated, generates a free-viewpoint image on the basis of the captured images, and transmits the free-viewpoint image to the information processing apparatus functioning as the main controller for image creation.

In the information processing apparatus according to the present technology described above, it is conceivable that the target image acquisition unit makes a request for transmission of a plurality of sets of image data for the generation target image section in each of the plurality of captured images in response to notification of the generation target image section.

That is, by the notification of the generation target image section, an image section to be acquired is recognized, and transmission of image data of a plurality of viewpoints for the section is requested.

In the information processing apparatus according to the present technology described above, it is conceivable that the target image acquisition unit acquires image data of one frame that corresponds to the generation target image section in each of the plurality of captured images.

This is processing in the case of generating a free-viewpoint image in the generation target image section of one frame, that is, a free-viewpoint image in which the viewpoint is changed in the state of a still image with the time stopped.

In the information processing apparatus according to the present technology described above, it is conceivable that the target image acquisition unit acquires image data for a section of a plurality of frames that corresponds to the generation target image section in each of the plurality of captured images.

This is processing in the case of generating a free-viewpoint image in the generation target image section of a plurality of frames, that is, a free-viewpoint image in which the viewpoint is changed in the state of a moving image without stopping the time.

In the information processing apparatus according to the present technology described above, it is conceivable that the image generation processing unit generates the free-viewpoint image by using viewpoint movement path information selected from among viewpoint movement path information stored in advance.

A plurality of pieces of information indicating the path of the viewpoint movement is prepared in advance, and is selected by the operation of the operator, for example.

In the information processing apparatus according to the present technology described above, it is conceivable that the transmission control unit performs control to transmit, to the another information processing apparatus, information designating a previous image or a subsequent image to be connected to the free-viewpoint image generated.

That is, a free-viewpoint image is received by the another information processing apparatus functioning as the main controller for clip creation, and information regarding the previous and subsequent images to be connected to the free-viewpoint image is also transmitted so as to be used for generating an output image in the another information processing apparatus.

In the information processing apparatus according to the present technology described above, it is conceivable that the transmission control unit performs control to transmit, to the another information processing apparatus, information designating a time length of a previous image or a subsequent image to be connected to the free-viewpoint image generated.

That is, a free-viewpoint image is received by the another information processing apparatus functioning as the main controller for clip creation, and information regarding the time lengths of the previous and subsequent images to be connected to the free-viewpoint image is also transmitted so as to be used for generating an output image in the another information processing apparatus.

An information processing method according to the present technology is an information processing method in which an information processing apparatus functioning as a main controller for image creation performs section identification processing for identifying, for a plurality of captured images simultaneously captured by a plurality of image capturing devices, a generation target image section for which a free viewpoint image is generated, target image transmission control processing for transmitting image data for the generation target image section in each of the plurality of captured images as image data used for generation of a free-viewpoint image in another information processing apparatus, and output image generation processing for generating an output image including a free-viewpoint image received.

Further, another information processing method according to the present technology is an information processing method in which an information processing apparatus functioning as a free-viewpoint image server performs image data acquisition processing for acquiring image data for a generation target image section for which a free-viewpoint image is generated in each of a plurality of captured images simultaneously captured by a plurality of image capturing devices, image generation processing for generating a free-viewpoint image by using the image data acquired in the image data acquisition processing, and transmission control processing for performing control to transmit the free-viewpoint image generated to another information processing apparatus.

Thus, each of the information processing apparatuses work in coordination to generate an output image including a free-viewpoint image.

BRIEF DESCRIPTION OF DRAWINGS

FIG. 6 is an explanatory diagram of a viewpoint in a free-viewpoint image according to an embodiment.

MODE FOR CARRYING OUT THE INVENTION

Hereinafter, embodiments are described in the following order.

<1. System Configuration>
<2. Configuration of Image Creation Controller and Free-viewpoint Image Server>
<3. GUI>
<4. Clip including Free-viewpoint Image>
<5. Clip Creation Processing>
<6. Camera Movement Detection>
<7. Conclusion and Modification Examples>

1. System Configuration

Figure 1:
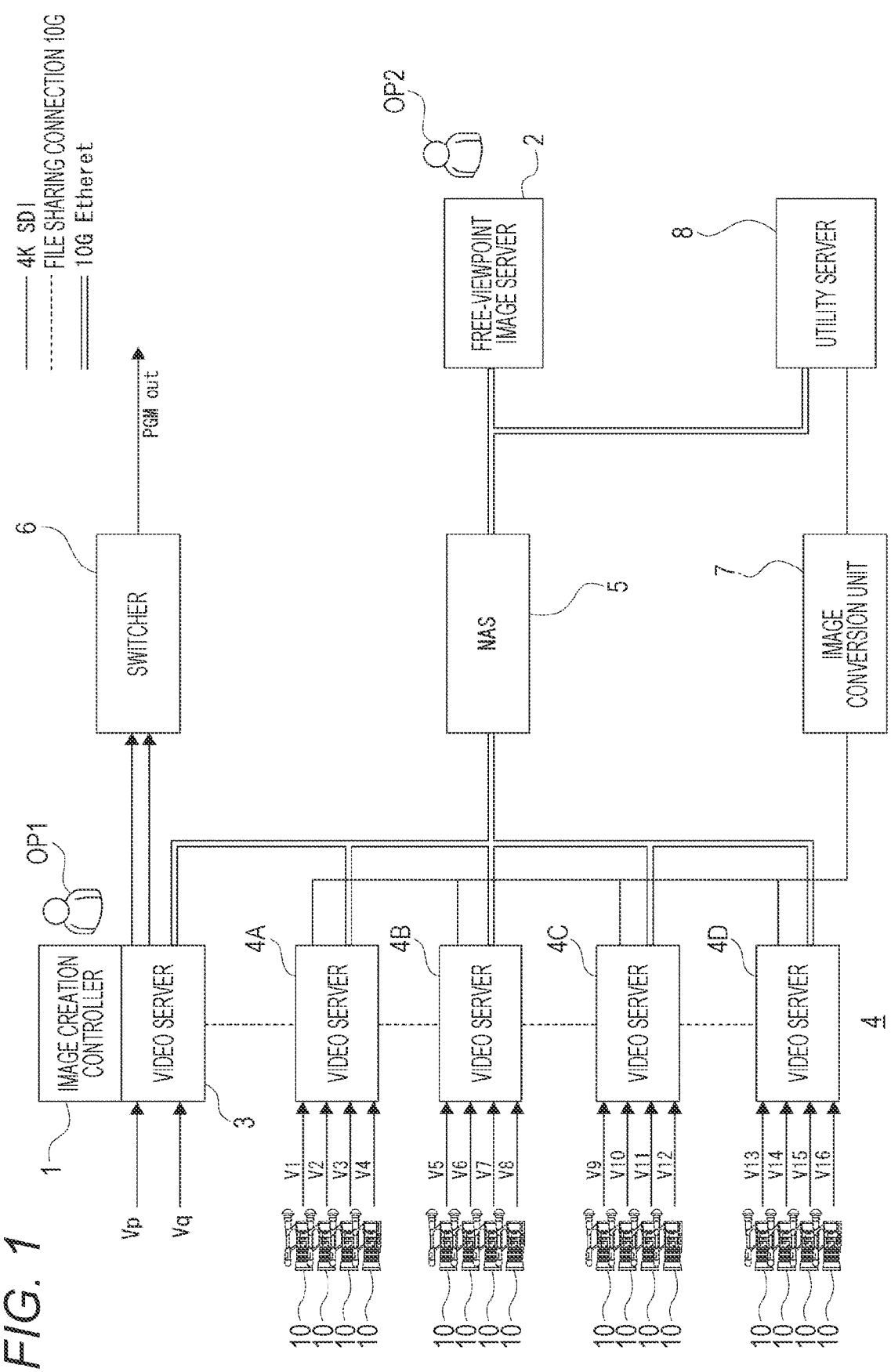
FIG. 1 is a block diagram of a system configuration according to an embodiment of the present technology.

FIG. 1 illustrates a configuration example of an image processing system according to an embodiment of the present technology.

The image processing system includes an image creation controller 1, a free-viewpoint image server 2, a video server 3, a plurality of (four, for example) video servers 4A, 4B, 4C, and 4D, a network attached storage (NAS) 5, a switches 6, an image conversion unit 7, a utility server 8, and a plurality of (sixteen, for example) image capturing devices 10.

Hereinafter, the term "camera" refers to the image capturing device 10. For example, "camera arrangement" means the arrangement of the plurality of image capturing devices 10.

Further, as a collective term for the video servers 4A, 4B, 4C, and 4D with no distinction, a "video server 4" is used.

In the image processing system, a free-viewpoint image corresponding to an image observed from any viewpoint fa a three-dimensional space can be generated on the basis of captured images (for example, image data V1 to V16) acquired from the plurality of image capturing devices 10, and an output clip including the free-viewpoint image can be created.

In FIG. 1, the state of connection between the individual units is indicated by a solid line, a broken line, and a double line.

The solid line indicates a connection of a serial digital interface (SDI) which is an interface standard for connecting between broadcast devices such as a camera and a switcher, and it is assumed to be 4K-compatible, for example. The image data is mainly sent and received between the individual devices by SDI wiring.

The double line indicates a connection of a communication standard for constructing a computer network, for example, 10 Gigabit Ethernet. The image creation controller 1, the free-viewpoint image server 2, the video servers 3, 4A, 4B, 4C, and 4D, the NAS 5, and the utility server 8 are connected via a computer network, so that image data and various control signals can be sent and received to and from each other.

The broken line between the video servers 3 and 4 indicates a state in which the video servers 3 and 4 equipped with an inter-server file sharing function are connected via, for example, a 10G network. As a result, between the video server 3 and the video servers 4A, 4B, 4C, and 4D, each video server can preview and send materials of the other video servers. That is, a system using the plurality of video servers is constructed, resulting in efficient highlight editing and sending.

Each of the image capturing devices 10 is implemented as a digital camera device with an image capturing element such as a charge coupled device (CCD) sensor or a complementary metal-oxide-semiconductor (CMOS) sensor, for example, and acquires captured images (image data V1 to V16) as digital data. In the present example, each of the image capturing devices 10 acquires a captured image as a moving image.

In the present example, it is assumed that each of the image capturing devices 10 captures an image of a situation in which competition for basketball, soccer, or the like is being held, and each of the image capturing devices 10 is disposed in a predetermined orientation at a predetermined position in a competition site where the competition is held. In the present example, the number of image capturing devices 10 is 16, but it is sufficient that the number of image capturing devices 10 is at least 2 or more to enable generation of a free-viewpoint image. The number of image capturing devices 10 is increased and images of a target subject is captured from many angles, which improves the accuracy of three-dimensional restoration of the subject and improves the image quality of a virtual viewpoint image.

Figure 2:
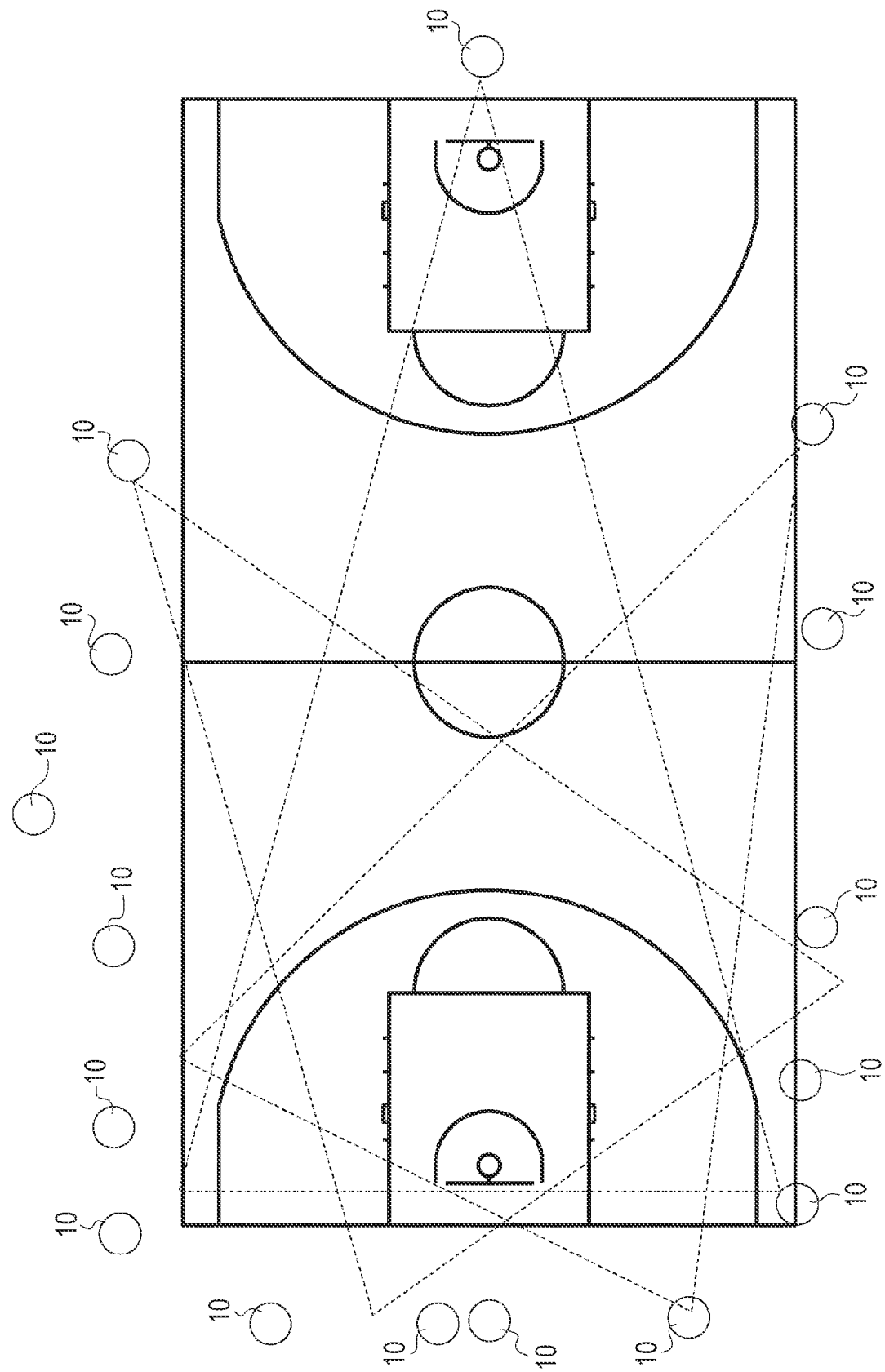
FIG. 2 is an explanatory diagram of an example of disposing a camera for generating a free-viewpoint image according to an embodiment.

FIG. 2 illustrates an example of disposing the image capturing devices 10 around a basketball court. It is assumed that a circle (o) represents the image capturing device 10. For example, FIG. 2 illustrates an example of camera arrangement in order to focus on capturing an image in the vicinity of the goal on the left side in the drawing. Of course, the camera arrangement and the number of cameras are examples, and shall be set according to the content and purpose of image capturing and broadcasting.

The image creation controller 1 is implemented by an information processing apparatus. The image creation controller 1 can be implemented by using, for example, a dedicated workstation, a general-purpose personal computer, a mobile terminal, or the like.

The image creation controller 1 performs processing for control/operation management of the video servers 3 and 4 and for clip creation.

As an example, the image creation controller 1 is a device operable by an operator OP1. The operator OP1 gives, for example, instructions to select or create clip content, and the like.

The free-viewpoint image server 2 is implemented as an information processing apparatus that performs processing for actually creating a free-viewpoint image (free view (FV) clip described later) in accordance with the instructions from the image creation controller 1 or the like. The free-viewpoint image server 2 can be also implemented by using, for example, a dedicated workstation, a general-purpose personal computer, a mobile terminal, or the like.

As an example, the free-viewpoint image server 2 is a device operable by an operator OP2. The operator OP2 performs, for example, a selection operation of a camerawork for creating an FV clip as a free-viewpoint image.

The configurations and processing of the image creation controller 1 and the free-viewpoint image server 2 are described later. Further, the operators OP1 and OP2 perform operations, but for example, the image creation controller 1 and the free-viewpoint image server 2 may be disposed side by side and operated by one operator.

Each of the video servers 3 and 4 is an image recording device, and includes, for example, a data recording unit such as a solid state drive (SSD) or a hard disk drive (HDD), and a control unit that performs data recording/playback control for the data recording unit.

The video servers 4A, 4B, 4C, and 4D can each receive an input of, for example, four systems, and each simultaneously record images captured by the four image capturing devices 10.

For example, the video server 4A records the image data V1, V2, V3, and V4. The video server 4B records the image data V5, V6, V7, and V8. The video server 4C records the image data V9, V10, V11, and V12. The video server 4D records the image data V13, V14, V15, and V16.

This allows all the images captured by the sixteen image capturing devices 10 to be simultaneously recorded.

The video servers 4A, 4B, 4C, and 4D record constantly, for example, during a game of sport to be broadcast.

The video server 3 is directly connected to the image creation controller 1, for example, and can perform input of two systems and output of two systems, for example. Image data Vp and Vq are illustrated as the input of two systems. As the image data Vp and Vq, images captured by any two of the image capturing devices 10 (any two sets of the image data V1 to V16) can be selected. The image data Vp and Vq may be images captured by another image capturing device, of course.

The image creation controller 1 can display the image data Vp and Vq on a display as monitor images. The operator OP1 can check the situation of a scene imaged and recorded for broadcast, for example, on the basis of the image data Vp and Vg inputted to the video server 3.

Further, since the video servers 3 and 4 are connected to enable file sharing, the image creation controller 1 can monitor and display the images captured by each of the image capturing devices 10 recorded in the video servers 4A, 4B, 4C, and 4D, which allows the operator OP1 to check the captured images one from another.

Note that, in the present example, the images captured by each of the image capturing devices 10 are time-coded, and frame synchronization can be achieved in processing of the video servers 3, 4A, 4B, 4C, and 4D.

The NAS 5 is a storage device on the network, and includes, for example, an SSD, an HDD, or the like. In the case of the present example, the NAS 5 is a device that stores, in a case where some frames of the image data V1, V2, . . . , and V16 recorded in the video servers 4A, 4B, 4C, and 4D are transferred for generation of a free-viewpoint image, the same for processing in the free-viewpoint image server 2 or stores the created free-viewpoint image.

The switcher 6 is a device that receives an input of an image outputted via the video server 3 and selects a main line image PGMout to be finally selected and broadcast. For example, a broadcast director or the like performs necessary operations.

The image conversion unit 7, for example, converts resolution of image data by the image capturing device 10 and combine the image data, generates a monitoring image of the camera arrangement, and provides the monitoring image to the utility server 8. For example, 16-system image data (V1 to V16), which is an 8K image, is converted to a 4-system image arranged in a tile shape after resolution conversion to a 4K image, and the 4-system image is supplied to the utility server 8.

The utility server 8 is a computer device capable of performing various related processing, and in the case of the present example, the utility server 8 is a device that performs processing for detecting camera movement for calibration. For example, the utility server 8 monitors image data supplied from the image conversion unit 7 to detect camera movement. The camera movement is, for example, change in arrangement position of any of the image capturing devices 10 disposed as illustrated in FIG. 2. Information regarding the arrangement position of the image capturing devices 10 is an important element for generation of a free-viewpoint image, and a change in arrangement position requires re-setting of parameters. Thus, the camera movement is monitored.

2. Configuration of Image Creation Controller and Free-Viewpoint Image Server The image creation controller 1, the free-viewpoint image server 2, the video servers 3 and 4, and the utility server 8 having the configuration described above can be implemented as an information processing apparatus 70 having the configuration illustrated in FIG. 3, for example.

Figure 3:
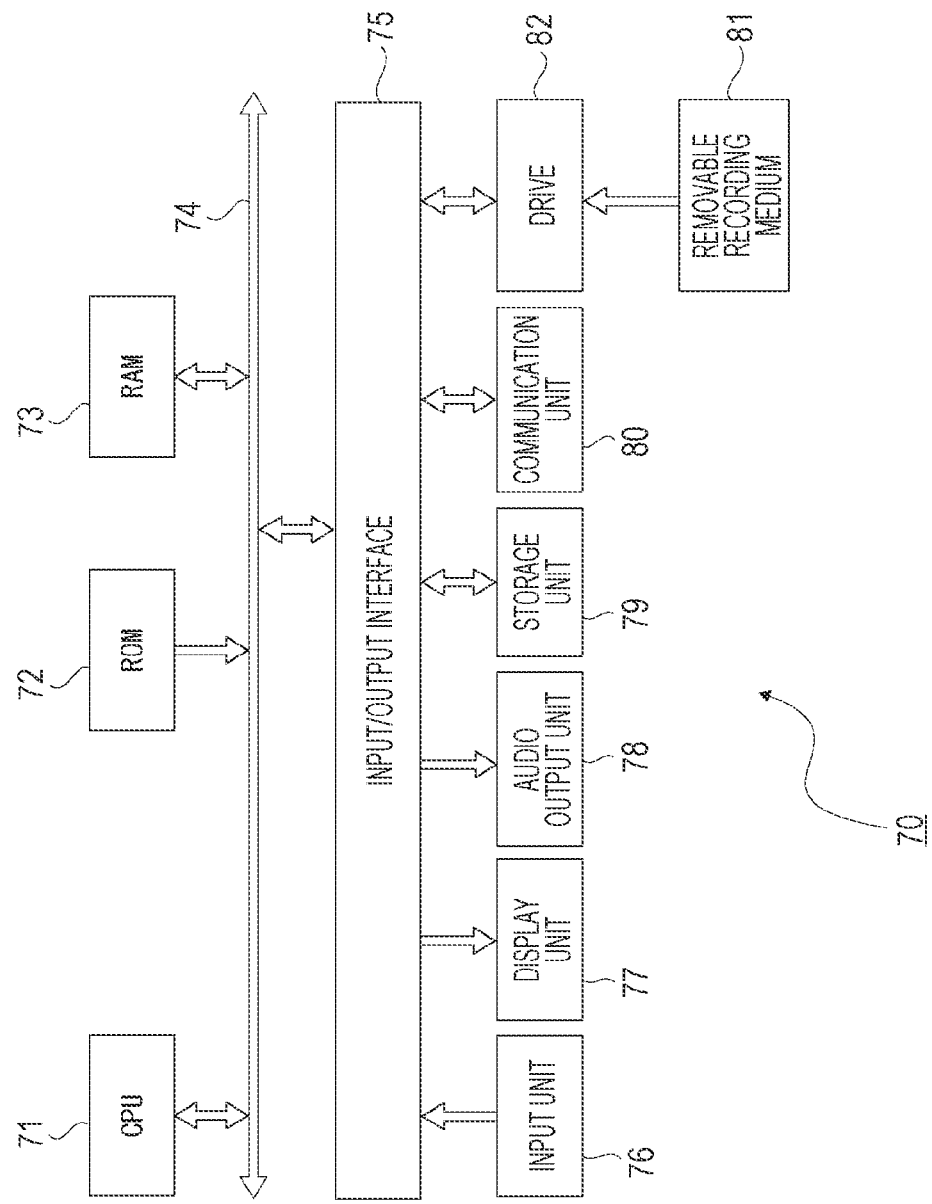
FIG. 3 is a block diagram of the hardware configuration of an information processing apparatus according to an embodiment.

In FIG. 3, a CPU 71 of the information processing apparatus 70 executes various processing according to a program stored in a ROM 72 or a program loaded from a storage unit 79 to a RAM 73. The RAM 73 also appropriately stores data and the like necessary for the CPU 71 to execute various processing.

The CPU 71, the RUM 72, and the RAM 73 are connected to one another via a bus 74. An input/output interface 75 is also connected to the bus 74.

An input unit 76 including an operator and an operation device is connected to the input/output interface 75.

The input unit 76 may be, for example, various operators and operation devices such as a keyboard, a mouse, a key, a dial, a touch panel, a touch pad, and a remote controller.

The input unit 76 detects a user operation, and a signal corresponding to the input operation is interpreted by the CPU 71.

Further, the input/output interface 75 is integrally or separately connected to a display unit 77 including a liquid crystal display (LCD), an organic electro-luminescence (EL) panel, or the like, and to an audio output unit 78 including a speaker or the like.

The display unit 77 is a display unit that shows various indications, and is implemented by, for example, a display device provided in a housing of the information processing apparatus 70, a separate display device connected to the information processing apparatus 70, or the like.

The display unit 77 serves to display, on a display screen, an image for various types of image processing, a moving image to be processed, and the like on the basis of a command from the CPU 71. Further, the display unit 77 displays various operation menus, icons, messages, and the like on the basis of a command from the CPU 71, that is, displays as a graphical user interface (GUI).

In some cases, the storage unit 79 implemented by a hard disk or a solid-state memory, and a communication unit 80 implemented by a modem are connected to the input/output interface 75.

The communication unit 80 performs communication processing via a transmission line such as the Internet, wired/wireless communication with various devices, bus communication, and so on.

A drive 82 is connected also to the input/output interface 75 as necessary, and a removable recording medium 81 such as a magnetic disk, an optical disk, a magneto-optical disk, or a semiconductor memory is appropriately attached thereto.

The drive 82 can read a data file such as an image file MF, various computer programs, and so on from the removable recording medium 81. The data file thus read out is stored in the storage unit 79, and images and audio contained in a data file are outputted by the display unit 77 and the audio output unit 78. Further, the computer program and the like read from the removable recording medium 81 are installed in the storage unit 79 as necessary.

In the information processing apparatus 70, software can be installed via network communication by the communication unit 80 or via the removable recording medium 81. Alternatively, the software may be stored in advance in the ROM 72, the storage unit 79, or the like.

Figure 4:
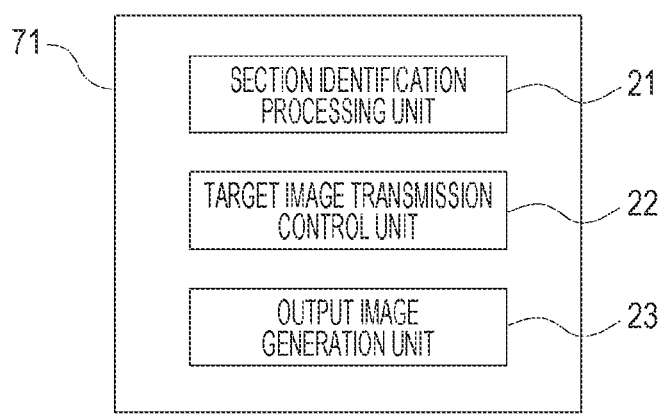
FIG. 4 is an explanatory diagram of functions of an image creation controller according to an embodiment.
Figure 5:
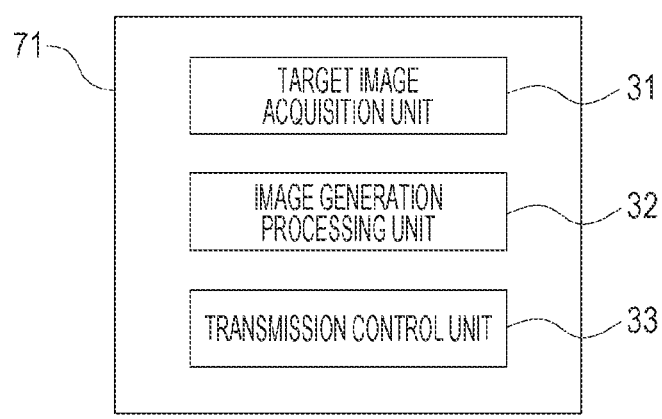
FIG. 5 is an explanatory diagram of functions of a free-viewpoint image server according to an embodiment.
Figure 7:
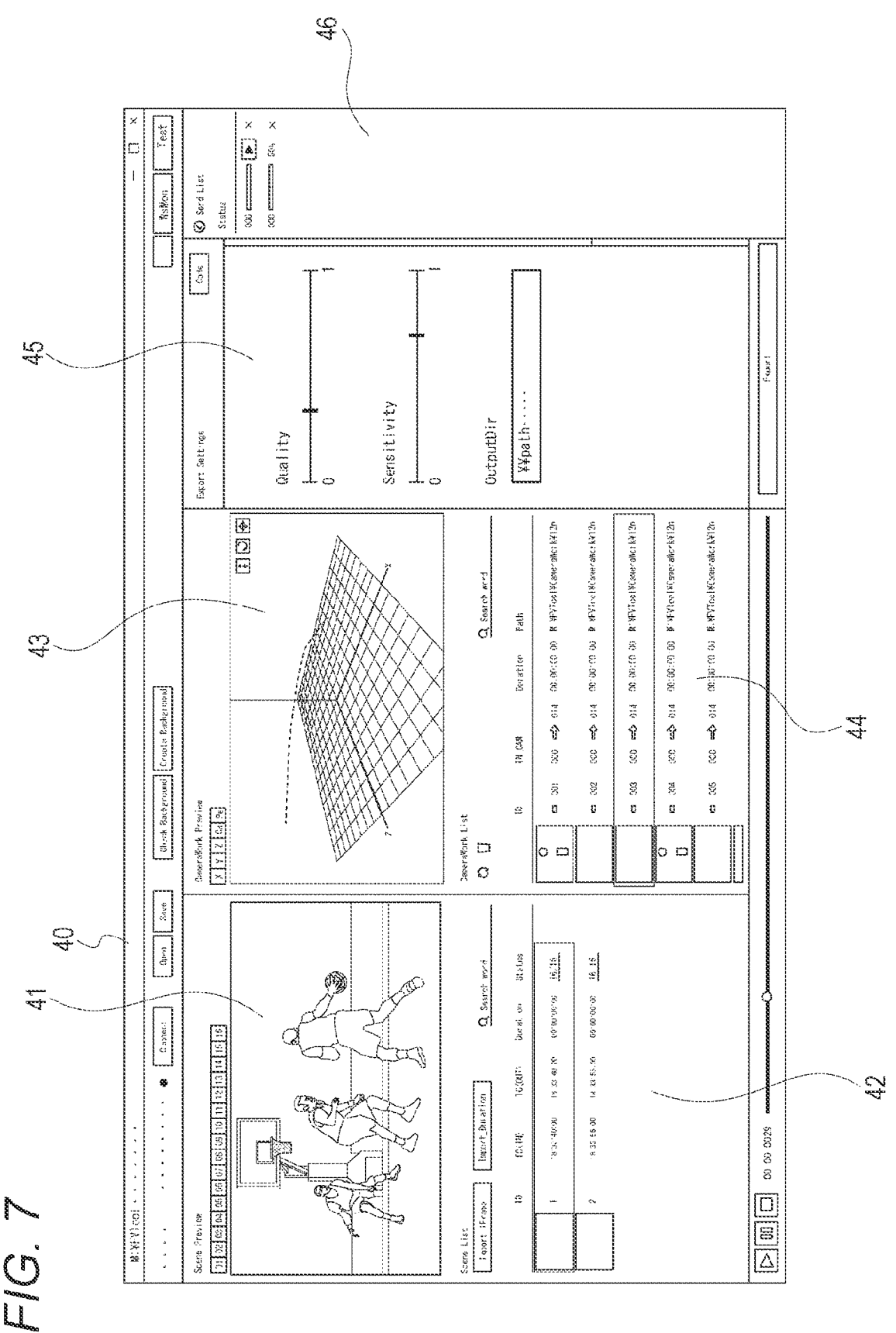
FIG. 7 is an explanatory diagram of a user interface screen on a free-viewpoint image server side according to an embodiment.

In a case where the image creation controller 1 or the free-viewpoint image server 2 is implemented by using such an information processing apparatus 70, the processing functions as illustrated in FIGS. 4 and 5 are implemented in the CPU 71 by software, for example.

FIG. 4 illustrates a section identification processing unit 21, a target image transmission control unit 22, and an output image generation unit 23 as functions formed in the CPU 71 of the information processing apparatus 70 serving as the image creation controller 1.

As for the plurality of captured images (image data V1 to V16) simultaneously captured by the plurality of image capturing devices 10, the section identification processing unit 21 performs processing for identifying a generation target image section for which a free-viewpoint image is to be generated. For example, in response to the operator OP1 performing an operation for selecting a scene to be replayed in an image, the section identification processing unit 21 performs processing for identifying the scene, in particular, a time code for a section of the scene to be a free-viewpoint image (generation target image section), and processing for notifying the free-viewpoint image server 2 of the time code.

Here, the generation target image section refers to a frame section that is actually used as a free-viewpoint image. In a case where a free-viewpoint image is generated for one frame in a moving image, that one frame corresponds to the generation target image section. In this case, in-point/out-point for the free-viewpoint image have the same time code.

Further, in a case where a free-viewpoint image is generated for a section of a plurality of frames in a moving image, the plurality of frames corresponds to the generation target image section. In this case, in-point/out-point for the free-viewpoint image have different time codes.

Note that, although the structure of the clip is described later, it is expected that the in-point/out-point of the generation target image section is different from in-point/out-point as an output clip to be finally generated. This is because a previous clip and a subsequent clip, which are described later, are coupled.

The target image transmission control unit 22 performs control to send image data for a generation target image section in each of the plurality of captured images, that is, one or a plurality of frames for the image data V1 to V16, as image data to be used for generation of a free-viewpoint image in the free-viewpoint image server 2. Specifically, the target image transmission control unit 22 performs control to transfer the image data as the generation target image section from the video servers 4A, 4B, 4C, and 4D to the NAS 5.

The output image generation unit 23 performs processing for generating an output image (output clip) including the received free-viewpoint image (FV clip) generated by the free-viewpoint image server 2.

For example, by the processing of the output image generation unit 23, the image creation controller 1 combines, on the time axis, with the FV clip that is a virtual image generated by the free-viewpoint image server 2, a previous clip that is an actual moving image at a previous time point and a subsequent clip that is an actual moving image at a subsequent time point, and obtain an output clip. That is, the previous clip+the FV clip+the subsequent clip is set as one output clip.

Of course, the previous clip+FV clip may be set as one output clip.

Alternatively, the FV clip+the subsequent clip may be set as one output clip.

Yet alternatively, an output clip of only the FV clip may be generated without combining the previous clip and the subsequent clip.

In any case, the image creation controller 1 generates an output clip including the FV clip to output the output clip to the switcher 6, so that the output clip can be used for broadcasting.

Next, FIG. 5 illustrates a target image acquisition unit 31, an image generation processing unit 32, and a transmission control unit 33 as functions formed in the CPU 71 of the information processing apparatus 70 serving as the free-viewpoint image server 2.

The target image acquisition unit 31 performs processing for acquiring image data for a generation target image section for which a free-viewpoint image is to be generated in each of the plurality of captured images (image data V1 to V16) simultaneously captured by the plurality of image capturing devices 10. That is, the target image acquisition unit 31 obtains image data of one frame or a plurality of frames specified by the in-point/out-point of the generation target image section identified by the image creation controller 1 with the function of the section identification processing unit 21 via The NAS 5 from The video servers 4A, 4B, 4C, and 4D, and can use the image data for generation of a free-viewpoint image.

For example, the target image acquisition unit 31 acquires, for all sets of the image data V1 to V16, image data of one frame or a plurality of frames of the generation target image section. The image data for the generation target image section for all sets of the image data V1 to V16 is acquired for generation of a high-quality free-viewpoint image. As described above, it is possible to generate a free-viewpoint image by using images captured by at least two or more image capturing devices 10; however, it is possible to generate a finer 3D model and generate a high-quality free-viewpoint image by increasing the number of image capturing devices 10 (that is, the number of viewpoints). Accordingly, for example, in a case where the sixteen image capturing devices 10 are disposed, the image data for the generation target image section is acquired for all sets of the image data (V1 to V16) of the sixteen image capturing devices 10.

The image generation processing unit 32 is a function to generate a free-viewpoint image using the image data acquired by the target image acquisition unit 31, that is, an FV clip in the present example.

For example, the image generation processing unit 32 performs modeling processing including 3D model generation and subject analysis, and processing such as rendering for generating a free-viewpoint image that is a two-dimensional image from the 3D model.

The 3D model generation is processing for generating 3D model data representing the subject in a three-dimensional space (that is, the three-dimensional structure of the subject restored from the two-dimensional image) on the basis of the images captured by each of the image capturing devices 10 and camera parameters for each of the image capturing devices 10 inputted from the utility server 8 or the like, for example. Specifically, the 3D model data includes data representing the subject in a three-dimensional coordinate system using (X, Y, Z).

In the subject analysis, a position, an orientation, and a posture of the subject as a person (player) are analyzed on the basis of the 3D model data. Specifically, estimation of the position of the subject, generation of a simple model of the subject, estimation of the orientation of the subject, and the like are performed.

Then, a free-viewpoint image is generated on the basis of the 3D model data and the subject analysis information. For example, a free-viewpoint image is generated such that the viewpoint is moved with respect to the 3D model of the player, as the subject, who is stationary.

The viewpoint of a free-viewpoint image is described with reference to FIG. 6.

FIG. 6A illustrates an image of a free-viewpoint image in which a subject is captured from a necessary viewpoint set in a three-dimensional space. In the free-viewpoint image in this case, a subject HS1 is viewed from substantially the front, and a subject HS2 is viewed from substantially the back.

FIG. 6B illustrates an image of a virtual viewpoint image for a case where the position of the viewpoint is changed in the direction of the arrow C in FIG. 6A, and the viewpoint to look at the subject HS1 substantially from the back is set in the free-viewpoint image of FIG. 6B, the subject HS2 is viewed from substantially the front, and a subject HS3 and a basket goal, which are not shown in FIG. 6A, are shown.

For example, an image of about 1 second to 2 seconds from the state of FIG. 6A in which the viewpoint is gradually moved in the direction of the arrow C to the state of FIG. 6B is generated as a free-viewpoint image (FV clip). Of course, the time length of the FV clip as the free-viewpoint image and the path of the viewpoint movement can be variously considered.

The transmission control unit 33 performs control to transmit the free-viewpoint image (FV clip) generated by the image generation processing unit 32 as described above to the image creation controller 1 via the NAS 5. In this case, the transmission control unit 33 controls to transmit also supplementary information for generation of an output image co the image creation controller 1. The supplementary information is assumed to be information designating images of the previous clip and the subsequent clip. That is, the supplementary information is information designating which image of the image data V1 to V16 is used to create (cut) the previous clip and the subsequent clip. Further, the supplementary information may be information designating the time length of the previous clip or the subsequent clip.

3. GUI

As described above, the FV clip as the free-viewpoint image is created in the free-viewpoint image server 2 in response to the operation of the operator OP2.

In the free-viewpoint image server 2, for example, a GUI screen 40 as illustrated in 7 is displayed in the display unit 77, so that the operator OP2 can check and perform an operation.

In a scene window 41, for example, an image for a generation target image section is displayed in a monitor to allow the operator OP2 to check the content of the scene for generating a free-viewpoint image.

In a scene list display part 42, for example, a list of scenes designated as the generation target image section is displayed. The operator OP2 can select a scene to be displayed in the scene window 41 at the scene list display part 42.

In a camerawork window 43, the positions of the image capturing devices 10 disposed, a selected camerawork, a plurality of selectable cameraworks, and the like are displayed.

The camerawork is information mainly indicating a path of the viewpoint movement in the free-viewpoint image. For example, in the case of creating an FV clip in which the orientation or distance as the position (that is, viewpoint) of the image capturing device 10 is changed with respect to the subject for which the 3D model has been generated, parameters necessary to form the path of the viewpoint are used as information regarding the camerawork. As the display of the camerawork, for example, the path of the viewpoint movement or the like is displayed.

In a camerawork list display part 44, a list of various pieces of information regarding camerawork created and stored in advance is displayed. The operator OP2 can select a camerawork to be used for FV clip generation from among the cameraworks displayed in the camerawork list display part 44.

In a parameter display part 45, various parameters related to the selected camerawork are displayed.

In a transmission window 46, information regarding transmission of the created FV clip to the image creation controller 1 is displayed.

4. Clip Including Free-Viewpoint Image

Next, an output clip including an FV clip as a free-viewpoint image is described.

Figure 8:
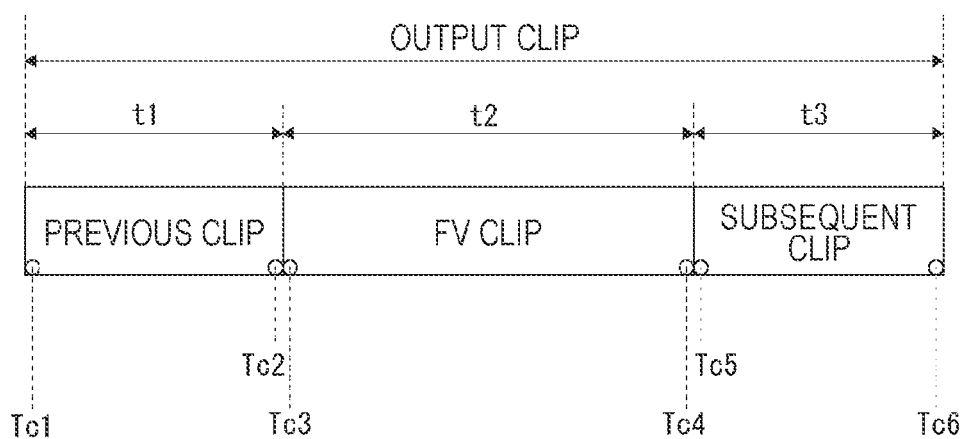
FIG. 8 is an explanatory diagram of an output clip according to an embodiment.

FIG. 8 illustrates, as an example, a state in which the output clip is configured by connecting a previous clip, an FV clip, and a subsequent clip.

For example, the previous clip is an actual moving image in a section of time codes TC1 to TC2 in certain image data Vx among the image data V1 to the image data V16.

Further, the subsequent clip is an actual moving image in a section of time codes TC5 to TC6 in certain image data Vy among the image data V1 to the image data V16.

It is normally assumed that the image data Vx is the image data of the image capturing device 10 before the start of the viewpoint movement by the FV clip, and the image data Vy is the image data of the image capturing device 10 at the end of the viewpoint movement by the FV clip.

In this example, the previous clip is a moving image having a time length t1, the FV clip is a free-viewpoint image having a time length t2, and the subsequent clip is a moving image having a time length t3. The playback time length of the entire output clip is equal to t1+t2+t3. For example, as an output clip for 5 seconds, the configuration of a 1.5 second moving image, a 2 second free-viewpoint image, a 1.5 second moving image, and the like is possible.

Here, the FV clip is illustrated as a section of time codes TC3 to TC4, but this may or may not correspond to the number of frames of the actual moving image.

To be specific, as the FV clip, there are a case where the viewpoint is moved with the time of the moving image stopped (TC3=TC4) and a case where the viewpoint is moved without stopping the time of the moving image (TC3≠TC4).

For description, an FV clip for a case where the viewpoint is moved with the time of the moving image stopped is referred to as a "still image FV clip", and an FV clip for a case where the viewpoint is moved without stopping the time of the moving image is referred to as a "moving image FV clip".

Figure 9:
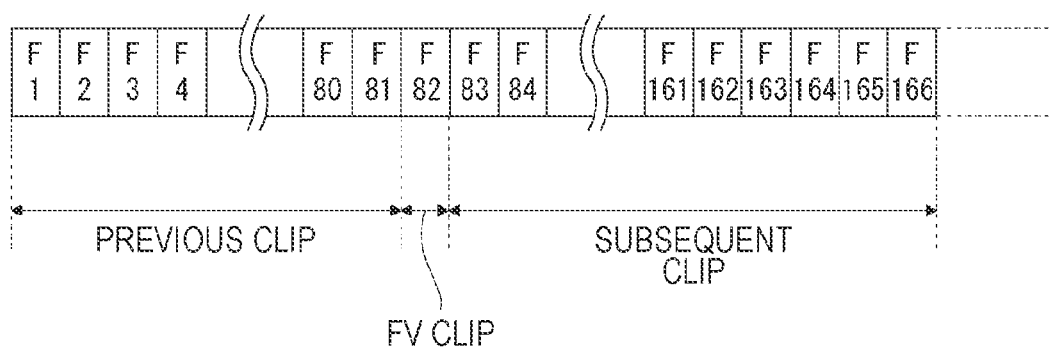
FIG. 9 is an explanatory diagram of an output clip including a still image FV clip according to an embodiment.

FIG. 9 illustrates the still image FV clip with reference to the frame or the moving image. In the case of this example, the time codes TC1 and TC2 of the previous clip are the time codes of the frames F1 and F81, and the time code of the following frame F82 is the time code TC3=TC4 in FIG. 8. Then, the time codes TC5 and TC6 of the subsequent clip are the time codes of the frames F83 and F166.

That is, this is The case of generating a free-viewpoint image in which the viewpoint moves with respect to the still image of one frame of the frame F82.

Figure 10:
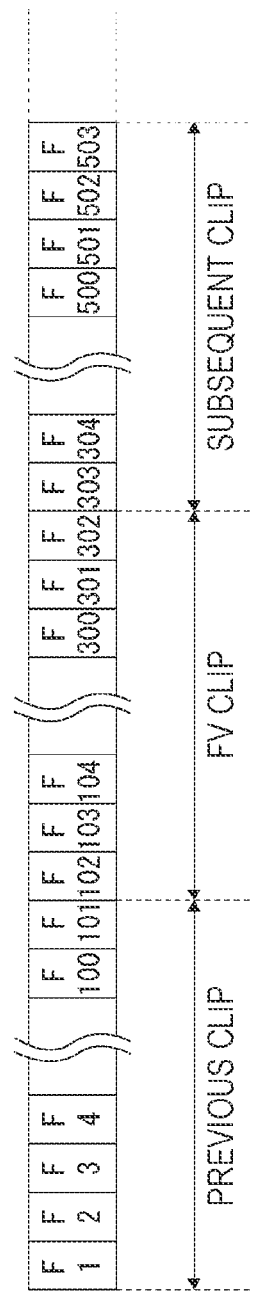
FIG. 10 is an explanatory diagram of an output clip including a moving image FV clip according to an embodiment.

Meanwhile, the moving image FV clip is as illustrated in FIG. 10. In the case of this example, the time codes TC1 and TC2 of the previous clip are the time codes of the frames F1 and F101, and the time code of the frames F102 and F302 is the time codes TC3 and TC4 in FIG. 8. Then, the time codes TC5 and TC6 of the subsequent clip are the time codes of the frames F303 and F503.

That is, this is the case of generating a free-viewpoint image in which the viewpoint moves with respect to the moving image of a plurality of frames from the frame F102 to frame 302.

Therefore, the generation target image section determined by the image creation controller 1 is a section of one frame of the frame F82 in the case of creating the still image FV clip of FIG. 9, and is a section of a plurality of frames from the frame F102 to the frame 302 in the case of creating The moving image FV clip of FIG. 10.

Figure 11:
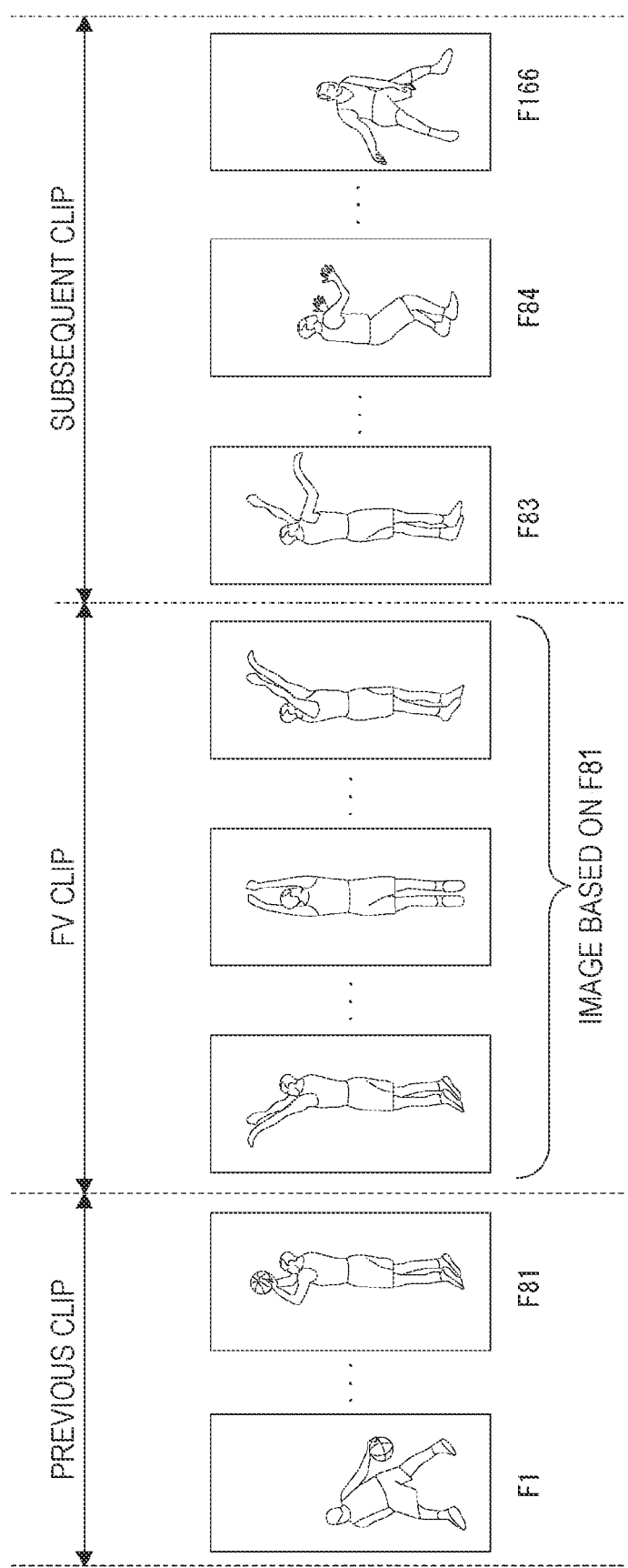
FIG. 11 is an explanatory diagram of an example of an image of an output clip according to an embodiment.

FIG. 11 illustrates an example of the image content of the output clip in the example of the still image FV clip of FIG. 9.

For example, in a case where a clip for several seconds is created as scenes before and after basketball shooting, an image in which the viewpoint position is moved is inserted, as a free-viewpoint image of the moment of shooting, between the actual images before and after shooting.

In FIG. 11, the previous clip is an actual moving image from the frame F1 to the frame F81. The FV clip is a virtual image in which the viewpoint is moved in the scene of the frame F81. The subsequent clip is an actual moving image from the frame F83 to frame F166.

For example, the output clip including the FV clip is generated as described above and used as an image to be broadcast.

Note that thein-point/out-point of the FV clip and the image therebetween may include both the image of the viewpoint from the actual camera position and the image of the viewpoint from a place other than the actual camera position, may include a plurality of images of the viewpoint from the actual camera position, and may include a plurality of images of the viewpoint from a place other than the actual camera position.

5. Clip Creation Processing

Hereinafter, a processing example of output clip creation performed in the image processing system of FIG. 1 is described. The processing of the image creation controller 1 and the free-viewpoint image server 2 is mainly described.

Figure 12:
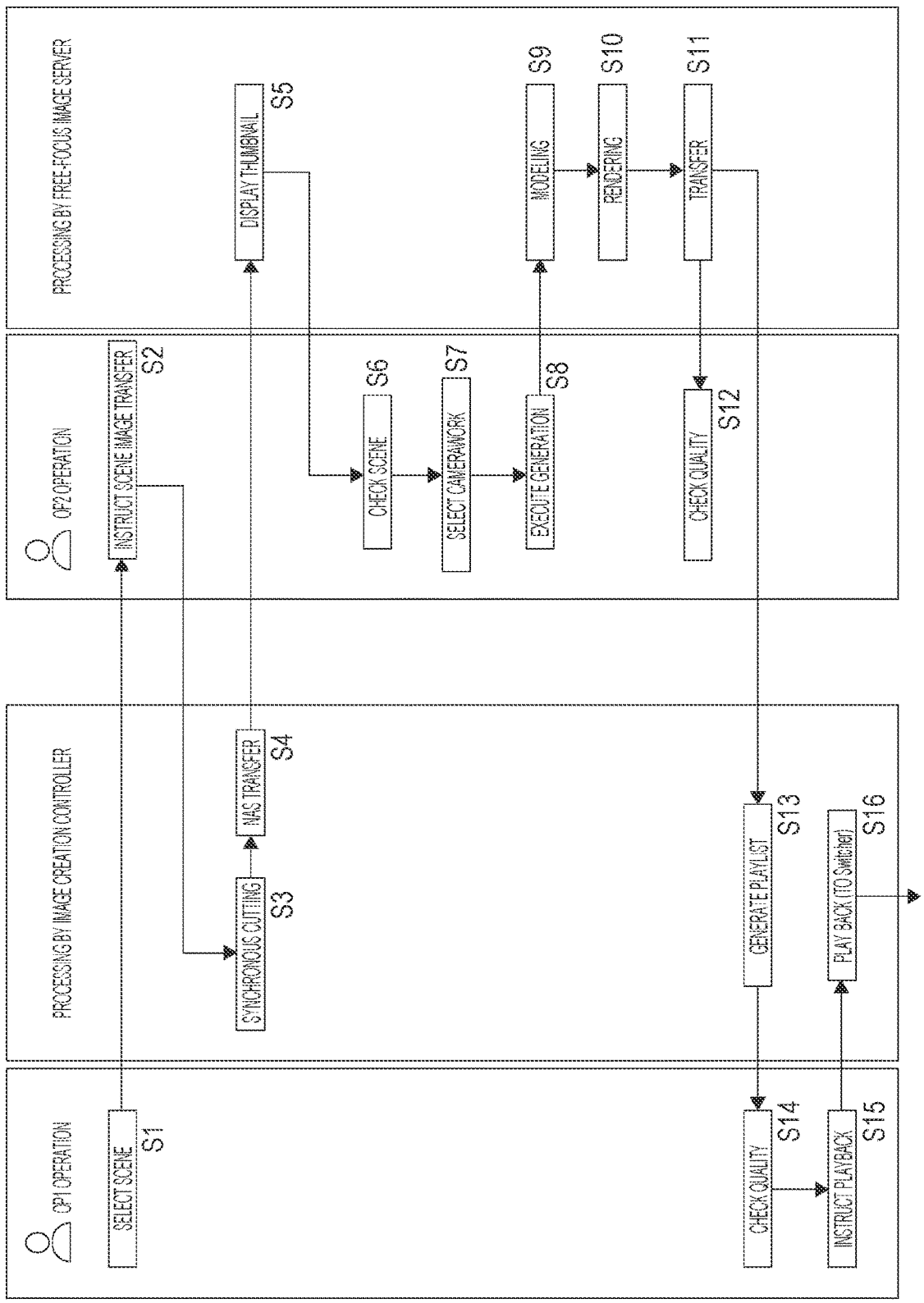
FIG. 12 is an explanatory diagram of workflow for clip creation according to an embodiment.

First, the flow of processing including operations of the operators OP1 and OP2 is described with reference to FIG. 12. Note that the processing of the operator OP1 in FIG. 12 summarizes the GUI processing of the image creation controller 1 and the operator operation. Further, the processing of the operator OP2 summarizes the GUI processing of the free-viewpoint image server 2 and the operator operation.

Step S1: Select Scene

In order to create an output clip, first, the operator OP1 selects a scene to be used as an FV clip. For example, the operator OP1 searches for a scene to be used as an FV clip while monitoring the captured images displayed in the display unit 77 on the image creation controller 1 side. Then, a generation target image section of one frame or a plurality of frames is selected.

Information regarding the generation target image section is conveyed to the free-viewpoint image server 2, so that the operator OP2 can recognize the same with the GUI in the display unit 77 on the free-viewpoint image server 2 side.

Specifically, the information regarding the generation target image section is information regarding the time codes TC3 and TC4 in FIG. 8. As described above, in the case of the still image FV clip, the time code TC3=TC4.

Step S2: Instruct Scene Image Transfer

In response to the generation target image section designated, the operator OP2 performs an operation for instructing transfer of an image of the corresponding scene. In response to this operation, the free-viewpoint image server 2 transmits a transfer request for image data for the sections of the time codes TC3 and TC4 to the image creation controller 1.

Step S3: Synchronous Cutting

In response to the transfer request for image data, the image creation controller 1 controls the video servers 4A, 4B, 4C, and 4D to cut the sections of the time codes TC3 and TC4 for each of 16-system image data from the image data V1 to the image data V16.

Step S4: NAS Transfer

Then, the image creation controller 1 transfers, to the NAS 5, data for the sections of the time codes TC3 and TC4 of all sets of the image data V1 to the image data V16.

Step S5: Display Thumbnail

The free-viewpoint image server 2 displays thumbnails for the image data V1 to the image data V16 for the section of the time codes TC3 and TC4 transferred to the NAS 5.

Step S6: Check Scene

The operator OP2 checks the scene content of the sections of the time codes TC3 and TC4 in the GUI screen 40 by the free-viewpoint image server 2.

Step S7: Select Camerawork

The operator OP2 selects a camerawork considered to be appropriate in the GUI screen 40 according to the scene content.

Step S8: Execute Generation

After selecting the camerawork, the operator OP2 performs an operation to execute generation of the FV clip.

Step S9: Modeling

The free-viewpoint image server 2 generates a 3D model of the subject, analyzes the subject, and the like by using data for the frames in the sections of the time codes TC3 and TC4 in each set of the image data V1 to V16, and parameters such as the arrangement position of each of the image capturing devices 10 inputted in advance.

Step S10: Rendering

The free-viewpoint image server 2 generates a free-viewpoint image on the basis of the 3D model data and the subject analysis information. At this time, a free-viewpoint image is generated so that the viewpoint movement based on the camerawork selected in step S7 is performed.

Step S11: Transfer

The free-viewpoint image server 2 transfers the generated FV clip to the image creation controller 1. At this time, not only the FV clip but also supplementary information such as information designating the previous clip and the subsequent clip and information designating the time lengths of the previous clip and the subsequent clip can be transmitted.

Step S12: Check Quality

Note that, on the free-viewpoint image server 2 side, the quality check by the operator OP2 can be performed before or after the transfer in step S11. To be specific, the free-viewpoint image server 2 plays back and displays the generated FV clip in the GUI screen 40 so that the operator OP2 can check the FV clip. In some cases, it is also possible that the operator OP2 regenerates an FV clip without the transfer.

Step S13: Generate Playlist

The image creation controller 1 uses the FV clip thus transmitted to Generate an output clip. In this case, one or both of the previous clip and the subsequent clip are combined with the FV clip on the time axis to generate the output clip.

The output clip may be generated as stream data in which each frame as the previous clip, each frame virtually generated as the FV clip, and each frame as the subsequent clip are actually connected in time series; however, in the processing example, the frames are virtually connected as a playlist.

To be specific, the playlist is generated such that the FV clip is played back following the playback of the frame section as the previous clip, and then the frame section as the subsequent clip is played back, so that the output clip can be played back without generating the stream data that is actually connected as the output clip.

Step S14: Check Quality

The GUI on the image creation controller 1 side allows playback based on the playlist, and the operator OP1 checks the content of the output clip.

Step S15: Instruct Playback

The operator OP1 gives playback instructions by a predetermined operation according to the quality check. The image creation controller 1 recognizes the input of the playback instructions.

Step S16: Play Back

In response to the playback instructions, the image creation controller 1 supplies the output clip to the switcher 6. This enables broadcasting of the output clip to be performed.

Figure 13:
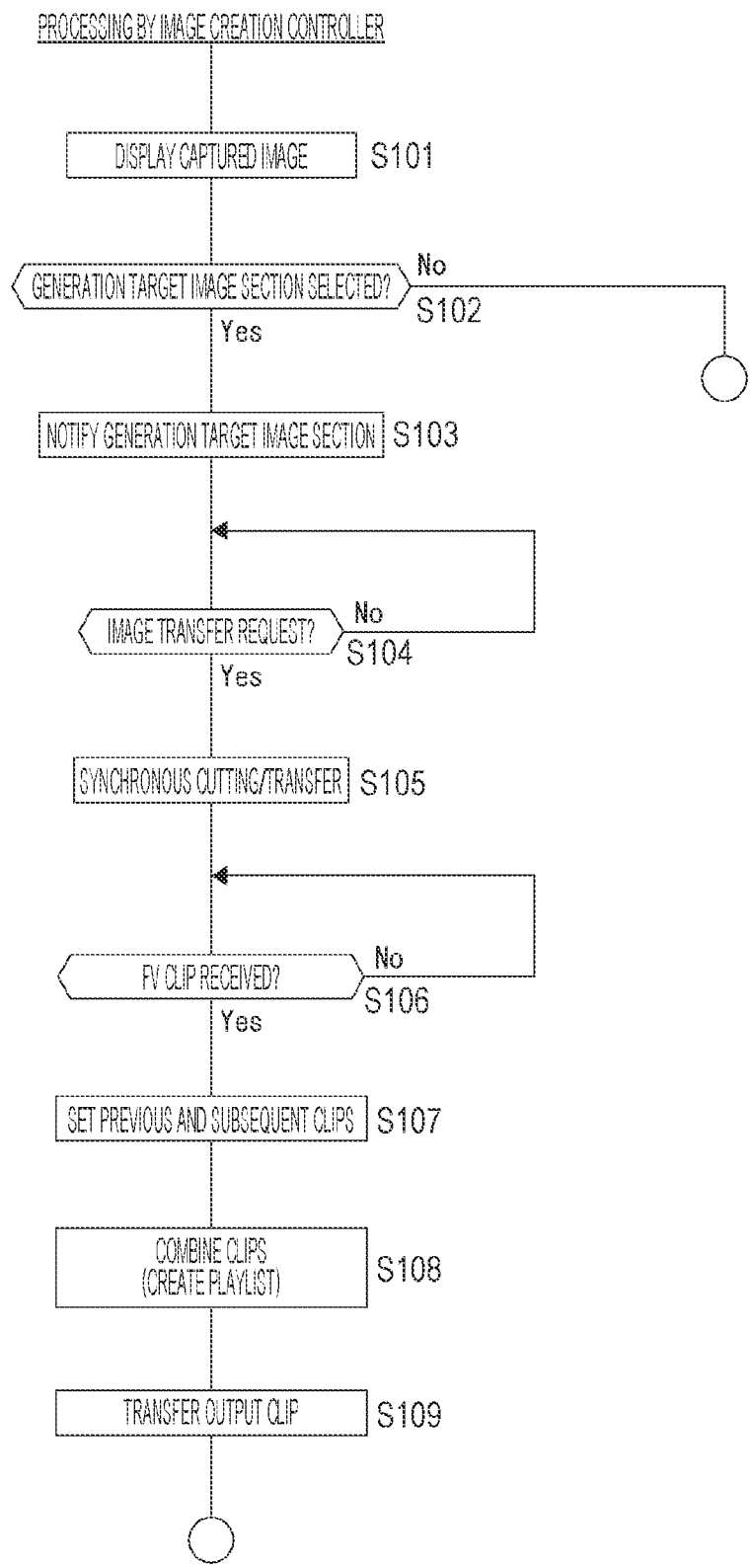
FIG. 13 is a flowchart of processing of an image creation controller according to an embodiment.
Figure 14:
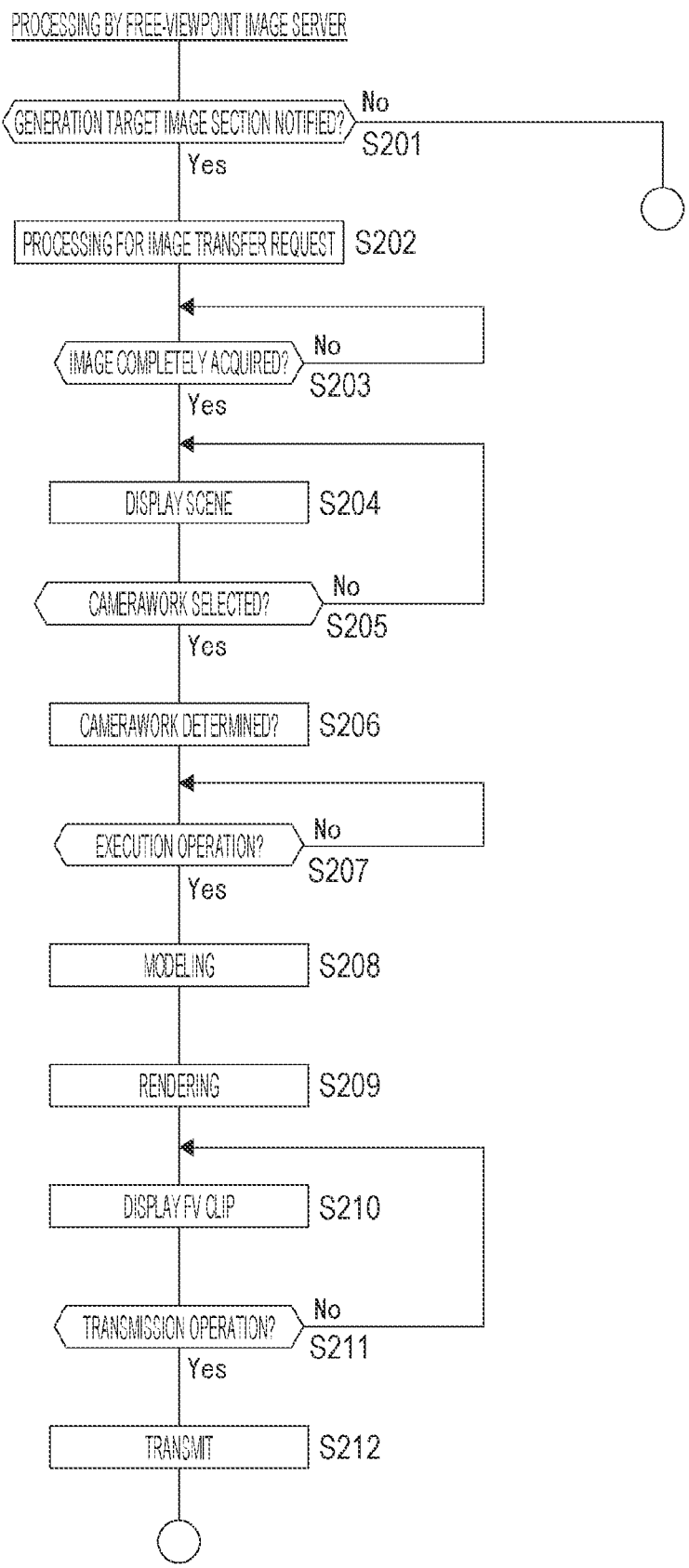
FIG. 14 is a flowchart of processing of a free-viewpoint image server according to an embodiment.

FIG. 13 illustrates the processing of the image creation controller 1 and FIG. 14 illustrates the processing of the free-viewpoint image server 2 for implementing the processing procedures described above.

FIG. 13 illustrates the processing executed by the CPU 71 of the information processing apparatus 70 serving as the image creation controller 1 by each function illustrated in FIG. 4.

FIG. 14 illustrates the processing executed by the CPU 71 of the information processing apparatus 70 serving as the free-viewpoint image server 2 by each function illustrated in FIG. 5.

In step S101 of FIG. 13, the image creation controller 1 performs captured image display control. For example, the image data Vp and Vg illustrated in FIG. 1 are displayed in the display unit 77, and can be monitored by the operator OP1.

In step S102 of FIG. 13, the image creation controller 1 monitors an operation for selecting the generation target image section. In a case where no selection operation is performed, the processing proceeds to another processing.

When the selection operation for the generation target image section by the operator OP1 is detected at certain point in time, the processing of the image creation controller 1 proceeds from step S102 to step S103, and the image creation controller 1 performs processing for notifying the free-viewpoint image server 2 of the information regarding the generation target image section, that is, the information regarding the in-point/out-point indicating the section of the scene for which the FV clip is generated.

Then, in step S104, the image creation controller 1 waits for transfer instructions from the free-viewpoint image server 2.

The free-viewpoint image server 2 side checks, in step S201 of FIG. 14, the notification of the generation target image section from the image creation controller 1.

When the information regarding the generation target image section is received, the processing of the free-viewpoint image server 2 proceeds from step S201 to step S202 in which processing for transfer request for image data is performed. For example, the free-viewpoint image server 2 displays the notification of the generation target image section in the GUI screen and presents the notification to the operator OP2, which enables a transfer request operation. Then, in response to the operation of the operator OP2, a transfer request is sent to the image creation controller 1.

Note that, in the above description, the transfer request involves operation of the operator OP2; however, the transfer request may be made without requiring any particular operation.

When sending the transfer request, the free-viewpoint image server 2 waits, in step S203, for the data of the frame of the generation target image section necessary in the image data (V1 to V16) to be transferred to the NAS 5.

When the transfer request from the free-viewpoint image server 2 is received, the processing of the image creation controller 1 proceeds from step S104 to step S105 of FIG. 13, and the image creation controller 1 performs control the video servers 4A, 45, 4C, and 4D to cut the generation target image section and transfer the same to the NAS 5. Thereby, frames (one frame or a plurality of frames) of the section of the in-point/out-point of the generation target image section in the image data V1 to V16 are transferred to the NAS 5.

Then, the processing of the image creation controller 1 proceeds to Step S106 and waits for the clip to be sent from the free-viewpoint image server 2.

The free-viewpoint image server 2 transfers the image data to the NAS 5, so that the image data can be acquired in a processable state. In a case where the image data is completely transferred to the NAS 5 and the free-viewpoint image server 2 is ready to process the image data, the processing proceeds from step S203 to step S204 in FIG. 14, and the scene is displayed in the GUI screen 40 using the acquired image data. This allows the operator OP2 to confirm the content of the scene for which the FV clip is to be created.

Then, in step S205, the free-viewpoint image server 2 monitors the camerawork selection operation by the operator OP2.

When the camerawork selection operation by the operator OP2 is detected, the processing of the free-viewpoint image server 2 proceeds from step S205 to step S206 in which the camerawork is determined, and the parameters are set for processing. Then, in step S207, the creation execution operation by the operator OP2 is monitored. Note that, in practice, it is desirable to allow the operator OP2 to select a camerawork again.

When the creation execution operation by the operator OP2 is detected, the processing of the free-viewpoint image server 2 proceeds from step S207 to step S208 in which the modeling processing described above is performed. Then, rendering is performed in step S209 to generate an FV clip.

In step S210, the free-viewpoint image server 2 displays the generated FV clip in the GUI screen 40 so that the operator OP2 can check the FV clip. Then, the transmission operation by the operator OP2 is monitored in step S211, and the FV clip is sent to the image creation controller 1 in step S212 in response to the transmission operation. Further, at this time, information designating the previous clip and the subsequent clip and information designating the time lengths of the previous clip and the subsequent clip are transmitted as the supplementary information in some cases.

When the reception of the FV clip is confirmed in step S106 of FIG. 13, the processing of the image creation controller 1 proceeds to step S107 in which the previous clip and the subsequent clip are set. For example, the previous clip and the subsequent clip are selected on the basis of the supplementary information. Specifically, which of the image data V1 to V16 is to be used for the previous clip and the subsequent clip is set.

The previous clip is desirably an image by the image capturing device 10 that corresponds to the viewpoint for a start image of the FV clip. Further, the subsequent clip is desirably an image by the image capturing device 10 that corresponds to the viewpoint for an end image of the FV clip. An image captured by which image capturing device 10 is used as the viewpoint position of the start image and the viewpoint position of the end image of the FV clip is information known to the free-viewpoint image server 2. That is, it is information regarding the image capturing device 10 corresponding to the start image and the image capturing device 10 corresponding to the end image of the FV clip, as defined by the camerawork used in the current FV clip generation processing. Therefore, the image creation controller 1 can easily set the previous clip and the subsequent clip by making setting so that the free-viewpoint image server 2 sends information designating the previous clip and the subsequent clip as the information indicating them as the supplementary information.

Further, the image creation controller 1 also sets the time lengths of the previous clip and the subsequent clip, and the time lengths thereof are only required to be set according to the supplementary information transmitted. For example, in order to determine, by the operator OP2 side, the lengths of the previous and subsequent clips according to the content and the time length of the FV clip and the camerawork, it is desirable that the free-viewpoint image server 2 side determine the time lengths of the previous clip and the subsequent clip, and the image creation controller 1 set the previous clip and the subsequent clip accordingly.

Note that, of course, the image creation controller 1 may determine the time lengths of the previous clip and the subsequent clip, or the fixed time length may be determined.

In step S108, the image creation controller 1 creates an output clip by combining the previous clip, the FV clip, and the subsequent clip. As described above, in this case, the output clip can be created by generating the playlist and virtually combining the play list.

In step S109, the image creation controller 1 performs processing for transferring the output clip to the switcher 6. In practice, the output clip is played back according to the playlist so that the operator OP1 can check the content, and is transmitted to the switcher 6 in response to the operation of the operator OP1.

As described above, the image creation controller 1 and the free-viewpoint image server 2 perform the processing of FIGS. 13 and 14, so that the output clip including the FV clip is generated, broadcast, and so on.

<6. Camera Movement Detection>

Note that, in order to generate a free-viewpoint image, a 3D model is generated using the image data V1, V2, . . . , and V16, parameters including positional information of each of the image capturing devices 10 are important.

For example, in a case where the position of a certain image capturing device 10 is moved during a broadcast, the parameters need to be calibrated accordingly. Therefore, in the image processing system in FIG. 1, the utility server 8 detects the camera movement.

Figure 15:
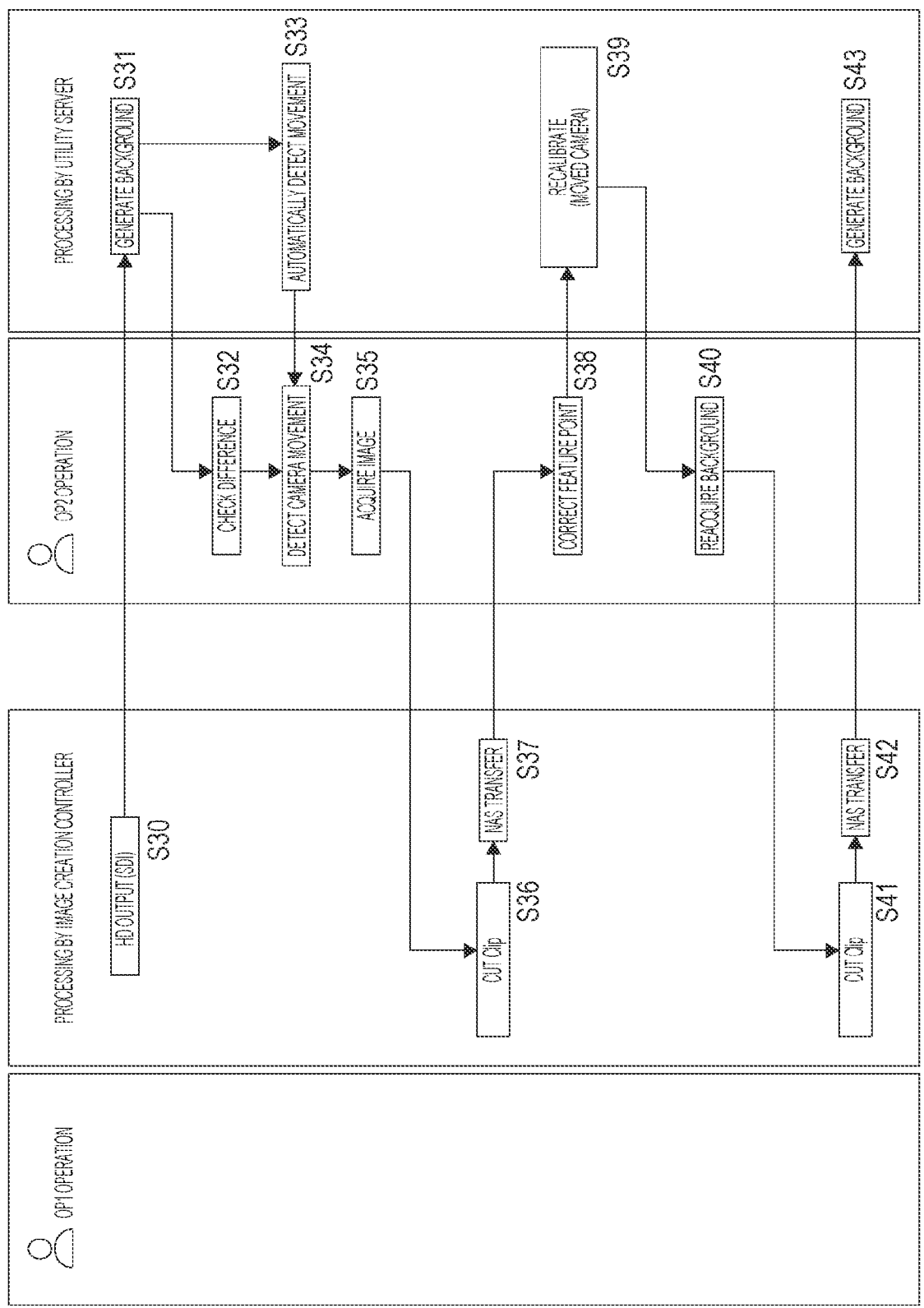
FIG. 15 is an explanatory diagram of workflow for camera movement detection according to an embodiment.

The processing procedures of the image creation controller 1 and the utility server 8 at the time of detection of the camera movement is described with reference to FIG. 15. FIG. 15 illustrates the processing procedures in a format similar to that of FIG. 12, but FIG. 15 illustrates an example in which the operator OP2 also operates the utility server 8.

Step S30: HD Output

The image creation controller 1 controls the video servers 4A, 4B, 4C, and 4D to output image data to the image conversion unit 7 for detection of camera movement. The images from the video servers 4A, 4B, 4C, and 4D, that is, the images of the sixteen image capturing devices 10 are subjected to resolution conversion by the image conversion unit 7 and the resultant is supplied to the utility server 8.

Step S31: Generate Background

The utility server 8 generates a background image on the basis of the image thus supplied. Since the background image is an image that does not change unless the camera position is changed, for example, a background image excluding the subject such as a player is generated for 16-system image data (V1 to V16).

Step S32: Check Difference

The background image is displayed in the GUI so that the operator OP2 can check a change in the image.

Step S33: Automatically Detect Movement

The camera movement can be automatically detected by performing comparison processing on the background image at each time point.

Step S34: Detect Camera Movement

As a result of step S32 or step S33 described above, the movement of a certain image capturing device 10 is detected.

Step S35: Acquire Image

Calibration is required as the image capturing device moves. Therefore, the utility server 8 requests, from the image creation controller 1, image data in the state after the movement.

Step S36: Cut Clip

In response to the request for image acquisition from the utility server 8, the image creation controller 1 controls the video servers 4A, 4B, 4C, and 4D to perform clip cutting for the image data V1 to V16.

Step S37: NAS Transfer

The image creation controller 1 controls the video servers 4A, 4B, 4C, and 4D to transfer the image data thus cut as a clip to the NAS 5.

Step S38: Correct Feature Point

The transfer to the NAS 5 allows the utility server 8 to refer to and also display the image in the state after the camera movement. The operator OP2 performs an operation necessary for calibration such as feature point correction.

Step S39: Recalibrate

The utility server 8 performs the calibration again for creating a 3D model using the image data (V1 to V16) in the state after the camera movement.

Step S40: Reacquire Background

After the calibration, in response to the operation of the operator OP2, the utility server 8 makes a request to reacquire image data for the background image.

Step S41: Cut Clip

In response to the request for image acquisition from the utility server 8, the image creation controller 1 controls the video servers 4A, 4B, 4C, and 4D to perform clip cutting for the image data V1 to V16.

Step S42: NAS Transfer

The image creation controller 1 controls the video servers 4A, 4B, 4C, and 4D to transfer the image data thus cut as a clip to the NAS 5.

Step S43: Generate Background

The utility server 8 generates a background image by using the image data transferred to the NAS 5. This is used, for example, as a background image serving as the reference for subsequent detection of camera movement.

For example, the detection of camera movement and the calibration are performed as in the above procedures, and thereby, for example, even in a case where the position of the image capturing device 10 is moved during a broadcast, the parameters are corrected accordingly, so that an FV clip with good accuracy can be continuously generated.

7. Conclusion and Modification Examples

The embodiment described above has the following effects.

The information processing apparatus 70 serving as the image creation controller 1 according to the embodiment includes the section identification processing unit 21 configured to perform processing, for a plurality of captured images (image data V1 to V16, for example) simultaneously captured by the plurality of image capturing devices 10, for identifying a generation target image section for which a free-viewpoint image is generated, the target image transmission control unit 22 configured to perform control to transmit image data for the generation target image section in each of the plurality of captured images (V1 to V16) as image data used for generation of an FV clip in the free-viewpoint image server 2, and the output image generation unit 23 configured to generate an output clip including an FV clip received.

Further, the information processing apparatus 70 serving as the free-viewpoint image server 2 according to the embodiment includes the target image acquisition unit 31 configured to acquire image data for a generation target image section for which a free-viewpoint image is generated in each of the plurality of captured images (V1 to V16) simultaneously captured by the plurality of image capturing devices 10, the image generation processing unit 32 configured to generate a free-viewpoint image by using the image data acquired, and the transmission control unit 33 configured to perform control to transmit the free-viewpoint image generated to the image creation controller 1.

In the case of such a configuration, the image creation controller 1 transfers only the image data for the generation target image section for an FV clip to the NAS 5. The free-viewpoint image server 2 generates an FV clip on the basis of 16-system image data transferred to the NAS 5, and transmits the FV clip to the image creation controller 1. The image creation controller 1 generates an output clip including the FV clip.

Therefore, the amount of the image data transferred to the NAS 5 (free-viewpoint image server 2 side) is small, the processing load on the free-viewpoint image server 2 side is small, which enables the FV clip to be generated in a short time. Further, it is only required to transmit the FV clip to the image creation controller 1 side, and the processing load on the free-viewpoint image server 2 is reduced, which is effective for quick clip creation.

Usually, in the case of creating an output clip including an FV clip, for example, it is assumed that an image of a scene of the entire output clip is transmitted to the NAS 5 (free-viewpoint image server 2 side), and processing for generating the entire output clip including the previous clip and the subsequent clip is performed on the free-viewpoint image server 2 side, which requires a relatively long processing time. In a broadcast site, for example, there is a request to broadcast a replay after 10 seconds of a play, but it is difficult to produce a clip including a free-viewpoint image in a short time.

On the other hand, in the case of the present embodiment, it is sufficient that the free-viewpoint image server 2 creates an FV clip on the basis of the image data of the scene in the section of the FV clip. This makes the operation of the embodiment extremely useful for shortening the time for output clip creation.

For example, in the case of live broadcast of sports or the like, it may be required to create an output clip in 10 seconds or so in order to broadcast a replay immediately. It is also advantageous for supporting such applications.

Further, as the number of image capturing devices 10 is larger, a free-viewpoint clip with higher accuracy can be created; therefore, it is desired to dispose as many image capturing devices 10 as possible. As the number of image capturing devices 10 increases, the data amount on the section for the FV clip increases. In view of this, a shorter section of the image data to be transferred is more desirable. In a case where the images captured by the sixteen image capturing devices 10 are transferred as in the present embodiment, for example, it is obvious that transferring the image data on the time code section (TC3 to TC4: TC3=TC4 or TC3≠TC4) for the FV clip to the sixteen NAS 5 is extremely advantageous in terms of the system processing efficiency, as compared to the transfer of the image data on the time code section (TC1 to TC6) for the entire output clip to the sixteen NAS 5.

The image creation controller 1 according to the embodiment performs processing for notifying the free-viewpoint image server 2 of information regarding the generation target image section identified, and performs transmission control on image data for the generation target image section in response to a request from the free-viewpoint image server 2.

Further, the free-viewpoint image server 2 according to the embodiment makes a request, in response to the notification of the generation target image section, for transmission of the plurality of sets of image data for the generation target mage section in each of the plurality of captured images.

As a result, after the notification of the target image section by the image creation controller 1, an FV clip can be generated according to the convenience of the free-viewpoint image server 2 or the operator OP2 side. This prevents the processing on the free-viewpoint image server 2 side from being complicated, and simplifies the FV clip generation processing and the operation of the operator OP2.

In the embodiment, an example has been described in which the section identification processing unit 21 of the image creation controller 1 identifies a section of one frame of the captured image as the generation target image section. The target image acquisition unit 31 of the free-viewpoint image server 2 acquires image data of one frame that corresponds to the generation target image section in each of the plurality of captured images. That is, this is the case of generating a still image FV clip.

In the case of a still image FV clip in which the viewpoint is changed in the state of a still image with time stopped, it is sufficient that the free-viewpoint image server 2 acquires only one frame each for the image data V1 to the image data V16 by the sixteen image capturing devices 10. This can extremely reduce the processing load in the transfer processing to the NAS 5 and in the processing of the free-viewpoint image server 2.

In the embodiment, an example has been described in which the section identification processing unit 21 of the image creation controller 1 identifies a section of a plurality of frames of the captured image as the generation target image section. The target image acquisition unit 31 of the free-viewpoint image server 2 acquires image data for a section of a plurality of frames that corresponds to the generation target image section in each of the plurality of captured images. That is, this is the case of generating a moving image FV clip.

In the case of a moving image FV clip in which the viewpoint is changed in the state of a moving image without stopping the time, it is sufficient that the free-viewpoint image server 2 acquires only a plurality of frames in the section of the moving image to be the FV clip for each set of the image data V1 to the image data V16 by the sixteen image capturing devices 10. Since the minimum necessary frame section is acquired, no unnecessary processing is performed in the transfer processing to the NAS 5 and the processing of the free-viewpoint image server 2.

In the embodiment, the output image generation unit 23 of the image creation controller 1 generates an output image obtained by combining, on the time axis, a previous image or a subsequent image with a free-viewpoint image.

To be specific, the output image generation unit 23 generates an output clip in which a previous clip or a subsequent clip is combined with a received FV clip, so that it is possible to Generate an output clip in which the viewpoint is moved in the middle of the scene, for example. Further, the previous clip and the subsequent clip are combined with the FV clip on the image creation controller 1 side, which reduces the processing load on the free-viewpoint image server 2, which is effective for quick clip creation.

In the embodiment, the output image generation unit 23 of the image creation controller 1 generates an output image as a virtual clip obtained by virtually combining, on the time axis, the free-viewpoint image with the previous image or the subsequent image on the basis of the playback list information.

To be specific, a playlist in which the previous clip and the subsequent clip are connected to the FV clip is formed, which makes it possible to output an image of an output clip by playback along the playlist without actually creating an output clip as an image data stream. This simplifies the processing on the image creation controller 1 side, and shortens the time to create an output clip, which is suitable for a request for quick creation of an output clip.

In the embodiment, an example has been described in which the transmission control unit 33 of the free-viewpoint image server 2 performs control to transmit, to the image creation controller 1, information designating a previous image or a subsequent image to be connected to the generated free-viewpoint image as the supplementary information. Then, the output image generation unit 23 of the image creation controller 1 acquires, from the free-viewpoint image server 2, information designating the previous image or the subsequent image to be connected to the free-viewpoint image, and generates an output image obtained by combining, on the time axis, the previous image or the subsequent image with the free-viewpoint image on the basis of the information.

The FV clip is an image in which a viewpoint changes from a certain viewpoint, that is, an image of a certain image capturing device 10 to another viewpoint, that is, an image of another image capturing device 10. That is, it is possible to grasp an image captured by which image capturing device 10 is used as an image to be connected to the previous and subsequent images of the FV clip, depending on the camerawork selected by the free-viewpoint image server 2. Therefore, the image creation controller 1 can prepare an appropriate image as the previous clip or the subsequent clip to be connected to the FV clip by easy processing by acquiring information regarding the previous clip or the subsequent clip from the free-viewpoint image server 2. Then, they are combined on the time axis with one another, so that an output clip having good compatibility before and after the viewpoint movement can be generated.

Further, since the previous clip and the subsequent clip can be identified on the basis of the camerawork information, the processing load on the free-viewpoint image server 2 does not increase.

In the embodiment, an example has been described in which the transmission control unit 33 of the free-viewpoint image server 2 performs control to transmit, to the image creation controller 1, information designating a time length of a previous image or a subsequent image to be connected to the generated free-viewpoint image as the supplementary information. Then, the output image generation unit 23 of the image creation controller 1 acquires, from the free-viewpoint image server 2, information designating a time length of a previous image or a subsequent image to be connected to a free-viewpoint image, prepares the previous image or the subsequent image on the basis of the information acquired, and generates an output image obtained by combining, on the time axis, the previous image or the subsequent image with the free-viewpoint image.

The free-viewpoint image server 2 designates the time length of the previous clip and the subsequent clip to be connected to the FV clip representing the viewpoint movement, which makes it possible to produce an output clip having a time length assumed from the free-viewpoint image server 2 side. For example, the operator OP2 who creates the FV clip can set the time length of the output clip according to the content of the FV clip.

An example has been described in which, in the free-viewpoint image server 2 according to the embodiment, the image generation processing unit 32 generates a free-viewpoint image by using the camerawork information selected from among the camerawork information (viewpoint movement path information) stored in advance.

A plurality of pieces of camerawork information is stored as information indicating the path of the viewpoint movement, and the operator OP2 selects the camerawork information according to the designated scene. This allows the FV clip to be generated only by selection, by the operator OP2, of the camerawork information according to the content of the scene as the generation target image section. Therefore, the FV clip for the viewpoint movement (camerawork) according to the content of the scene can be created in a short time.

As the embodiment, a program is possible which causes, for example, a CPU, a DSP, or the like, or a device including the CPU and the DSP to execute the processing described in FIG. 13.

Specifically, the program according to the embodiment is a program that causes an information processing apparatus to execute section identification processing (S102, S103) for identifying, for the plurality of captured images (V1 to V16) simultaneously captured by the plurality of image capturing devices 10, a generation target image section for which a free-viewpoint image is generated, target image transmission control processing (S105) for transmitting image data for the generation target image section in each of the plurality of captured images as image data used for generation of a free-viewpoint image in another information processing apparatus, and output image generation processing (S107, S108) for generating an output image including a free-viewpoint image received.

With such a program, the image creation controller 1 described above can be implemented in a device as the information processing apparatus 70.

Further, as the embodiment, a program is possible which causes, for example, a CPU, a DSP, or the like, or a device including the CPU and the DSP to execute the processing described in FIG. 14.

Specifically, the program according to the embodiment is a program that causes an information processing apparatus to execute image data acquisition processing (S202, S203) for acquiring image data for a generation target image section for which a free-viewpoint image is generated in each of the plurality of captured images (V1 to V16) simultaneously captured by the plurality of image capturing devices 10, image generation processing (S204 to S209) for generating a free-viewpoint image by using the image data acquired in the image data acquisition processing, and transmission control processing (S212) for performing control to transmit the free-viewpoint image generated to another information processing apparatus.

With such a program, the free-viewpoint image server 2 described above can be implemented in a device as the information processing apparatus 70.

The programs can be recorded in advance in an HDD as a recording medium built in a device such as a computer device, a ROM in a microcomputer having a CPU, or the like.

Alternatively, the programs can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as so-called package software.

Further, such a program can be installed from a removable recording medium to a personal computer or the like, or can be downloaded from a download site via a network such as a local area network (LAN) or the Internet.

Further, such a program is suitable to be provided extensively to the image creation controller 1 and the free-viewpoint image server 2 of the embodiment. For example, by downloading the program to a personal computer, a portable information processing apparatus, a mobile phone, a game device, a video device, a personal digital assistant (PDA), or the like, the personal computer or the like can function as the image creation controller 1 or the free-viewpoint image server 2 of the present disclosure.

Note that the effects described in the present specification are only examples and are not limitative ones, and further there may be other effects.

Note that the present technology may also be configured as below.

(1)

An information processing apparatus including:

a section identification processing unit configured to perform processing, for a plurality of captured images simultaneously captured by a plurality of image capturing devices, for identifying a generation target image section for which a free-viewpoint image is generated;

a target image transmission control unit configured to perform control to transmit image data for the generation target image section in each of the plurality of captured images as image data used for generation of a free-viewpoint image in another information processing apparatus; and an output image generation unit configured to generate an output image including a free-viewpoint image received.

(2)

The information processing apparatus according to (1) described above, in which the section identification processing unit performs processing for notifying the another information processing apparatus of information regarding the generation target image section identified, and the target image transmission control unit performs transmission control on image data for the generation target image section in response to a request from the another information processing apparatus.

(3)

The information processing apparatus according to (1) or (2) described above, in which the section identification processing unit identifies, as the generation target image section, a section of one frame of a captured image.

(4)

The information processing apparatus according to (1) or (2) described above, in which the section identification processing unit identifies, as the generation target image section, a section of a plurality of frames of a captured image.

(5)

The information processing apparatus according to any one of (1) to (4) described above, in which the output image generation unit generates an output image obtained by combining, on a time axis, a previous image or a subsequent image with a free-viewpoint image.

(6)

The information processing apparatus according to any one of (1) to (5) described above, in which the output image generation unit generates an output image as a virtual clip obtained by virtually combining, on a time axis, a free-viewpoint image with a previous image or a subsequent image on the basis of playback list information.

(7)

The information processing apparatus according to any one of (1) to (6) described above, in which the output image generation unit acquires, from the another information processing apparatus, information designating a previous image or a subsequent image to be connected to a free-viewpoint image, and generates an output image obtained by combining, on a time axis, the previous image or the subsequent image with the free-viewpoint image on the basis of the information acquired.

(8)

The information processing apparatus according to any one of (1) to (7) described above, in which the output image generation unit acquires, from the another information processing apparatus, information designating a time length of a previous image or a subsequent image to be connected to a free-viewpoint image, prepares the previous image or the subsequent image on the basis of the information acquired, and generates an output image obtained by combining, on a time axis, the previous image or the subsequent image with the free-viewpoint image.

(9)

An information processing apparatus including:

a target image acquisition unit configured to acquire image data for a generation target image section for which a free-viewpoint image is generated in each of a plurality of captured images simultaneously captured by a plurality of image capturing devices;

an image generation processing unit configured to generate a free-viewpoint image by using the image data acquired by the target image acquisition unit; and a transmission control unit configured to perform control to transmit the free-viewpoint image generated to another information processing apparatus.

(10)

The information processing apparatus according to (9) described above, in which the target image acquisition unit makes a request for transmission of a plurality of sets of image data for the generation target image section in each of the plurality of captured images in response to notification of the generation target image section.

(11)

The information processing apparatus according to (9) or (10) described above, in which the target image acquisition unit acquires image data of one frame that corresponds to the generation target image section in each of the plurality of captured images.

(12)

The information processing apparatus according to (9) or (10) described above, in which the target image acquisition unit acquires image data for a section of a plurality of frames that corresponds to the generation target image section in each of the plurality of captured images.

(13)

The information processing apparatus according to any one of (9) co (12) described above, in which the image generation processing unit generates the free-viewpoint image by using viewpoint movement path information selected from among viewpoint movement path information stored in advance.

(14)

The information processing apparatus according to any one of (9) to (13) described above, in which the transmission control unit performs control to transmit, to the another information processing apparatus, information designating a previous image or a subsequent image to be connected to the free-viewpoint image generated.

(15)

The information processing apparatus according to any one of (9) to (14) described above, in which the transmission control unit performs control to transmit, to the another information processing apparatus, information designating a time length of a previous image or a subsequent image to be connected to the free-viewpoint image generated.

(16)

An image processing system including a first information processing apparatus and a second information processing apparatus to output an output image including a free-viewpoint image, in which the first information processing apparatus includes a section identification processing unit configured to perform processing, for a plurality of captured images simultaneously captured by a plurality of image capturing devices, for identifying a generation target image section for which a free-viewpoint image is generated, a target image transmission control unit configured to perform control to transmit image data for the generation target image section in each of the plurality of captured images as image data used for generation of a free-viewpoint image in the second information processing apparatus, and an output image generation unit configured to generate an output image including a free-viewpoint image received, and the second information processing apparatus includes a target image acquisition unit configured to acquire image data for the generation target image section for which a free-viewpoint image is generated in each of the plurality of captured images, an image generation processing unit configured to generate a free-viewpoint image by using the image data acquired by the target image acquisition unit, and a transmission control unit configured to perform control to transmit the free-viewpoint image generated to the first information processing apparatus.

(17)

An information processing method including:

performing, by an information processing apparatus, section identification processing for identifying, for a plurality of captured images simultaneously captured by a plurality of image capturing devices, a generation target image section for which a free-viewpoint image is generated;

performing, by the information processing apparatus, target image transmission control processing for transmitting image data for the generation target image section in each of the plurality of captured images as image data used for generation of a free-viewpoint image in another information processing apparatus; and performing, by the information processing apparatus, output image generation processing for generating an output image including a free-viewpoint image received.

(18)

An information processing method including:

performing, by an information processing apparatus, image data acquisition processing for acquiring image data for a generation target image section for which a free-viewpoint image is generated in each of a plurality of captured images simultaneously captured by a plurality of image capturing devices;

performing, by the information processing apparatus, image generation processing for generating a free-viewpoint image by using the image data acquired in the image data acquisition processing; and performing, by the information processing apparatus, transmission control processing for performing control to transmit the free-viewpoint image generated to another information processing apparatus.

REFERENCE SIGNS LIST

1 Image creation controller
2 Free-viewpoint image server
3, 4, 4A, 4B, 4C, 4D Video server
5 NAS
6 Switcher
7 Image conversion unit
8 Utility server
10 Image capturing device
21 Section identification processing unit
22 Target image transmission control unit
23 Output image generation unit
31 Target image acquisition unit
32 Image generation processing unit
33 Transmission control unit
70 Information processing apparatus
71 CPU
77 Display unit

The invention claimed is:

1. An information processing apparatus comprising:
a section identification processing unit configured to perform processing, for a plurality of captured images simultaneously captured by a plurality of image capturing devices, for identifying a generation target image section for which a free-viewpoint image is generated;
a target image transmission control unit configured to perform control to transmit image data for the generation target image section in each of the plurality of captured images as image data used for generation of a free-viewpoint image in another information processing apparatus; and
an output image generation unit configured to generate an output image including the free-viewpoint image received from the another information processing apparatus,
wherein the free-viewpoint image is generated based on viewpoint movement path information determined from among a plurality of pieces of viewpoint movement path information stored in advance according to content of a start image and an end image of a scene including the plurality of captured images, and
wherein the section identification processing unit, the target image transmission control unit, and the output image generation unit are each implemented via at least one processor.

2. The information processing apparatus according to claim 1,
wherein the section identification processing unit is further configured to perform processing for notifying the another information processing apparatus of information regarding the generation target image section identified, and
wherein the target image transmission control unit performs transmission control on image data for the generation target image section in response to a request from the another information processing apparatus.

3. The information processing apparatus according to claim 1,
wherein the section identification processing unit identifies, as the generation target image section, a section of one frame of a captured image simultaneously captured by each of the plurality of image capturing devices.

4. The information processing apparatus according to claim 1,
wherein the section identification processing unit identifies, as the generation target image section, a section of a plurality of frames of a captured image simultaneously captured by each of the plurality of image capturing devices.

5. The information processing apparatus according to claim 1,
wherein the output image generation unit generates the output image obtained by combining, on a time axis, at least one of a previous image or a subsequent image with the free-viewpoint image.

6. The information processing apparatus according to claim 1,
wherein the output image generation unit generates the output image as a virtual clip obtained by virtually combining, on a time axis, the free-viewpoint image with at least one of a previous image or a subsequent image based on playback list information.

7. The information processing apparatus according to claim 1,
wherein the output image generation unit is further configured to acquire, from the another information processing apparatus, information designating at least one of a previous image or a subsequent image to be connected to the free-viewpoint image, and
wherein the output image generation unit generates the output image obtained by combining, on a time axis, the previous image or the subsequent image with the free-viewpoint image based on the information acquired.

8. The information processing apparatus according to claim 1,
wherein the output image generation unit is further configured to
acquire, from the another information processing apparatus, information designating a time length of at least one of a previous image or a subsequent image to be connected to a free-viewpoint image, and
prepare the previous image or the subsequent image based on the information acquired, and
wherein the output image generation unit generates an output image obtained by combining, on a time axis, the previous image or the subsequent image with the free-viewpoint image.

9. The information processing apparatus according to claim 1,
wherein the viewpoint movement path information is determined using a camerawork window in which the plurality of pieces of viewpoint movement path information stored in advance are displayed.

10. An information processing apparatus comprising:
a target image acquisition unit configured to acquire image data for a generation target image section for which a free-viewpoint image is generated in each of a plurality of captured images simultaneously captured by a plurality of image capturing devices;
an image generation processing unit configured to generate a free-viewpoint image by using the image data acquired by the target image acquisition unit; and
a transmission control unit configured to perform control to transmit the free-viewpoint image generated by the image generation processing unit to another information processing apparatus,
wherein the image generation processing unit generates the free-viewpoint image based on viewpoint movement path information determined from among a plurality of pieces of viewpoint movement path information stored in advance according to content of a start image and an end image of a scene including the plurality of captured images, and
wherein the target image acquisition unit, the image generation processing unit, and the transmission control unit are each implemented via at least one processor.

11. The information processing apparatus according to claim 10,
wherein the target image acquisition unit is further configured to make a request for transmission of a plurality of sets of image data for the generation target image section in each of the plurality of captured images in response to notification of the generation target image section.

12. The information processing apparatus according to claim 10,
wherein the target image acquisition unit acquires the image data of one frame that corresponds to the generation target image section in each of the plurality of captured images simultaneously captured by each of the plurality of image capturing devices.

13. The information processing apparatus according to claim 10,
wherein the target image acquisition unit acquires the image data for a section of a plurality of frames that corresponds to the generation target image section in each of the plurality of captured images simultaneously captured by each of the plurality of image capturing devices.

14. The information processing apparatus according to claim 10,
wherein the image generation processing unit generates the free-viewpoint image by using selected viewpoint movement path information that is selected from among the plurality of pieces of viewpoint movement path information stored in advance.

15. The information processing apparatus according to claim 10,
wherein the transmission control unit is further configured to perform control to transmit, to the another information processing apparatus, information designating at least one of a previous image or a subsequent image to be connected to the free-viewpoint image generated.

16. The information processing apparatus according to claim 10,
wherein the transmission control unit is further configured to perform control to transmit, to the another information processing apparatus, information designating a time length of the at least one of the previous image or the subsequent image to be connected to the free-viewpoint image generated.

17. An image processing system comprising:
a first information processing apparatus; and
a second information processing apparatus to output an output image including a free-viewpoint image,
wherein the first information processing apparatus includes
a section identification processing unit configured to perform processing, for a plurality of captured images simultaneously captured by a plurality of image capturing devices, for identifying a generation target image section for which a free-viewpoint image is generated,
a target image transmission control unit configured to perform control to transmit image data for the generation target image section in each of the plurality of captured images as image data used for generation of a free-viewpoint image in the second information processing apparatus, and
an output image generation unit configured to generate an output image including the free-viewpoint image received from the second information processing apparatus,
wherein the second information processing apparatus includes
a target image acquisition unit configured to acquire image data for the generation target image section for which a free-viewpoint image is generated in each of the plurality of captured images,
an image generation processing unit configured to generate a free-viewpoint image by using the image data acquired by the target image acquisition unit, and
a transmission control unit configured to perform control to transmit the free-viewpoint image generated to the first information processing apparatus,
wherein the image generation processing unit generates the free-viewpoint image based on viewpoint movement path information determined from among a plurality of pieces of viewpoint movement path information stored in advance according to content of a start image and an end image of a scene including the plurality of captured images, and
wherein the section identification processing unit, the target image transmission control unit, the output image generation unit, the target image acquisition unit, the image generation processing unit, and the transmission control unit are each implemented via at least one processor.

18. An information processing method comprising:
performing, by an information processing apparatus, section identification processing for identifying, for a plurality of captured images simultaneously captured by a plurality of image capturing devices, a generation target image section for which a free-viewpoint image is generated;
performing, by the information processing apparatus, target image transmission control processing for transmitting image data for the generation target image section in each of the plurality of captured images as image data used for generation of a free-viewpoint image in another information processing apparatus; and
performing, by the information processing apparatus, output image generation processing for generating an output image including the free-viewpoint image received,
wherein the free-viewpoint image is generated based on viewpoint movement path information determined from among a plurality of pieces of viewpoint movement path information stored in advance according to content of a start image and an end image of a scene including the plurality of captured images.

19. An information processing method comprising:
performing, by an information processing apparatus, image data acquisition processing for acquiring image data for a generation target image section for which a free-viewpoint image is generated in each of a plurality of captured images simultaneously captured by a plurality of image capturing devices;
performing, by the information processing apparatus, image generation processing for generating a free-viewpoint image by using the image data acquired in the image data acquisition processing; and
performing, by the information processing apparatus, transmission control processing for performing control to transmit the free-viewpoint image generated by the information processing apparatus to another information processing apparatus,
wherein the free-viewpoint image is generated based on viewpoint movement path information determined from among a plurality of pieces of viewpoint movement path information stored in advance according to content of a start image and an end image of a scene including the plurality of captured images.

* * * * *